United States Patent
Ayambem et al.

(10) Patent No.: US 10,329,203 B2
(45) Date of Patent: *Jun. 25, 2019

(54) LOW DUSTING ADDITIVE FOR JOINT COMPOUND

(71) Applicant: Henry Company, LLC, El Segundo, CA (US)

(72) Inventors: Amba Ayambem, Glenmoore, PA (US); Daniel Kent, Phoenixville, PA (US)

(73) Assignee: Henry Company, LLC, El Segundo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/624,161

(22) Filed: Jun. 15, 2017

(65) Prior Publication Data

US 2017/0362482 A1    Dec. 21, 2017

Related U.S. Application Data

(60) Provisional application No. 62/350,296, filed on Jun. 15, 2016.

(51) Int. Cl.

| | |
|---|---|
| *C09K 3/22* | (2006.01) |
| *C04B 40/00* | (2006.01) |
| *C04B 26/06* | (2006.01) |
| *C04B 24/14* | (2006.01) |
| *C08K 3/00* | (2018.01) |
| *C04B 26/02* | (2006.01) |
| *C04B 20/10* | (2006.01) |
| *C04B 103/00* | (2006.01) |
| *C04B 111/00* | (2006.01) |

(52) U.S. Cl.
CPC ...... *C04B 40/0039* (2013.01); *C04B 20/1033* (2013.01); *C04B 20/1048* (2013.01); *C04B 26/02* (2013.01); *C04B 26/06* (2013.01); *C04B 2103/0075* (2013.01); *C04B 2111/00672* (2013.01)

(58) Field of Classification Search
CPC .................................. C08K 5/01; C09K 3/22
See application file for complete search history.

(56) References Cited

U.S. PATENT DOCUMENTS

| | | |
|---|---|---|
| 4,294,622 A | 10/1981 | Brown |
| 4,370,167 A | 1/1983 | Mudd |
| 4,391,647 A | 7/1983 | Deer et al. |

(Continued)

*Primary Examiner* — Alexandre F Ferre
(74) *Attorney, Agent, or Firm* — BakerHostetler

(57) ABSTRACT

The present invention relates generally to wall repair compounds such as joint compounds, spackling compounds, and the like used to repair imperfections in walls or fill joints between adjacent wallboard panels. Particularly, the present invention relates to such a wall repair compound comprising a dust reduction additive (DRA) that reduces the quantity of airborne dust generated when the hardened compound is sanded. The dust reduction additive also imparts adhesion to the wall repair compounds to which it is added, for example to a joint compound. More specifically, this dust reduction additive is of sufficiently lighter shade to not impact the shade of the joint compound upon addition. In one embodiment, this invention relates to a non-foaming dust reduction additive that comprises paraffin and/or micro-crystalline wax-based emulsion.

19 Claims, 9 Drawing Sheets

(56) References Cited

U.S. PATENT DOCUMENTS

| | | | |
|---|---|---|---|
| 4,454,267 | A | 6/1984 | Williams |
| 4,525,388 | A | 6/1985 | Rehder et al. |
| 4,686,253 | A | 8/1987 | Struss et al. |
| 4,782,632 | A | 11/1988 | Matechuk |
| 4,955,748 | A | 9/1990 | Krumholz |
| 4,972,013 | A | 11/1990 | Koltisko, Jr. et al. |
| 5,277,712 | A | 1/1994 | McInnis |
| 5,336,318 | A | 8/1994 | Attard et al. |
| 5,746,822 | A | 5/1998 | Espinoza et al. |
| 5,779,786 | A | 7/1998 | Patel |
| 6,358,309 | B1 | 3/2002 | Langford |
| 6,406,537 | B1 | 6/2002 | Immordino |
| 6,476,099 | B1 | 11/2002 | Cimaglio et al. |
| 6,545,066 | B1 | 4/2003 | Immordino, Jr. et al. |
| 9,115,027 | B2 | 8/2015 | Ayambem et al. |
| 2008/0141909 | A1 | 6/2008 | Immordino et al. |
| 2009/0227451 | A1 | 9/2009 | Rose et al. |
| 2012/0216944 | A1 | 8/2012 | Langford |
| 2015/0158999 | A1 | 6/2015 | Ayambem et al. |
| 2016/0090451 | A1 | 3/2016 | Ayambem |
| 2017/0275479 | A1* | 9/2017 | Ayambem ................ C09D 5/34 |

\* cited by examiner

Dust Testing Chamber

Test Chamber dimensions:
6 ft. high
4 ft. wide
2 ft. deep

DustTrak DRX 8533 Aerosol Monitor
- Total Dust monitoring (OSHA PEL 15 mg/m$^3$)
- Respirable Dust monitoring (OSHA PEL 5 mg/m$^3$)
- Flow rate = 3 L/min
- Data logging every three seconds Mechanical sander with 120 grit sandpaper Sanding completed within 45 seconds

Dust Drop™ Low Dust Additive

Sample preparation:

- Joint compound applied as strip on drywall
- Joint compound strip size = 1.75" x 4.0"
- Dried for minimum of 3 days prior to dust testing

LOW DUSTING ADDITIVE FOR JOINT COMPOUND

CROSS REFERENCE TO RELATED APPLICATIONS

This application claims benefit of U.S. Provisional Application 62/350,296, filed Jun. 15, 2016, the contents of which are incorporated herein by reference.

TECHNICAL FIELD

The present invention relates generally to wall repair compounds such as joint compounds, spackling compounds, and the like used to repair imperfections in walls or fill joints between adjacent wallboard panels. Particularly, the present invention relates to such a wall repair compound comprising a dust reduction additive (DRA) that reduces the quantity of airborne dust generated when the hardened compound is sanded. The dust reduction additive also imparts adhesion to the wall repair compounds to which it is added, for example to a joint compound. More specifically, this dust reduction additive is of sufficiently lighter shade to not impact the shade of the joint compound upon addition. In one embodiment, this invention relates to a non-foaming dust reduction additive that comprises paraffin and/or micro-crystalline wax-based emulsion.

Micro-crystalline wax is a refined mixture of solid, saturated aliphatic hydrocarbons. It is characterized by a higher molecular weight branched molecular structure, longer hydrocarbon chains, and higher naphthenic hydrocarbon content, compared to the paraffin wax that contains mostly unbranched alkanes. In one embodiment, the low-dust joint compound comprises a filler, a binder, a thickener, and micro-crystalline wax. The micro-crystalline wax imparts low dusting properties without a sticky or oily feel. The invention provides a joint compound with improved properties for drywall finishing.

This invention also relates to a composition for a joint compound for use in filling and coating the joints between adjacent panels of gypsum wallboard. More specifically, it relates to a composition for a lightweight joint compound of the setting or drying type that generates less airborne dust when the set or dried joint compound is sanded, and additionally provides for more uniform gloss retention upon painting.

BACKGROUND

Interior walls of residential and commercial buildings are often constructed using gypsum wallboard panels, often referred to simply as "wallboard" or "drywall." The wallboard panels are attached to studs using nails or other fasteners, and the joints between adjacent wallboard panels are filled using a specially formulated adhesive composition called joint compound to conceal the joints.

The procedure for concealing the joint between adjacent wallboards, and thereby producing a smooth seamless wall surface, typically includes applying soft, wet, joint compound within the joint or seam formed by the abutting edges of adjacent wallboard panels using a trowel or the like. A fiberglass, cloth, or paper reinforcing tape material is then embedded within the wet joint compound, and the compound is allowed to harden. After the joint compound has hardened, a second layer of joint compound is applied over the joint and tape to completely fill the joint and provide a smooth surface. This layer is also allowed to harden. Upon hardening, the joint compound is sanded smooth to eliminate surface irregularities. Paint or a wall covering, such as wall paper, can then be applied over the joint compound so that the joint and the drywall compound are imperceptible under the paint or wall covering. The same joint compound can also be used to conceal defects caused by the nails or screws used to affix the wallboard panels to the studs, or to repair other imperfections in the wallboard panels, so as to impart a continuously smooth appearance to the wall surface.

Various drywall joint compounds are known for concealing joints between adjacent wallboard panels. Conventional joint compounds typically include a filler material and a binder. Conventional fillers are calcium carbonate and calcium sulfate dihydrate (gypsum), which are used in "ready-mixed" joint compounds, and calcium sulfate hemihydrate ($CaSO_4$-½$H_2O$; also referred to as plaster-of-Paris or calcined gypsum), which is used in "setting-type" joint compounds. Ready-mixed joint compounds, which are also referred to as pre-mixed or drying-type joint compounds, are pre-mixed with water during manufacturing and require little or no addition of water at the job site. Such joint compounds harden when the water evaporates and the compound dries. Setting-type joint compounds, on the other hand, harden upon being mixed with water, thereby causing dihydrate crystals to form and interlock. Setting-type joint compounds are therefore typically supplied to the job site in the form of a dry powder to which the user then adds a sufficient amount of water to give the compound a suitable consistency.

The Koltisko, Jr. et al. U.S. Pat. No. 4,972,013 provides an example of a ready-mixed (wet) joint compound including a filler, binder, thickener, non-leveling agent, and water. The McInnis U.S. Pat. No. 5,277,712 provides an example of a setting (dry mix-type) joint compound including a fine plaster material, such as stucco (a material which imparts internal strength) and methyl cellulose (which provides workability and water retention) to the joint compound. Additional examples of joint compounds are provided in the Brown U.S. Pat. No. 4,294,622; the Mudd U.S. Pat. No. 4,370,167; the Williams U.S. Pat. No. 4,454,267; the Struss et al. U.S. Pat. No. 4,686,253; the Attard et al. U.S. Pat. No. 5,336,318; and the U.S. Pat. No. 5,779,786.

A spackling compound is disclosed in the Deer et al. U.S. Pat. No. 4,391,648. While joint compound and spackling compound do many of the same things and are both smeared onto walls to hide flaws, spackling compound is generally lighter, dries more quickly, sands more easily, and is more expensive than joint compound. For simplicity, joint compound, drywall joint compound, and like expressions are used throughout this specification to refer to wall repair compounds generally, including joint compound and spackling compound.

Sanding hardened joint compound can be accomplished using conventional techniques including power sanders, abrasive screens, or manual sanders which consist simply of a supporting block and a piece of abrasive paper mounted on the block. Sanding the joint compound, however, produces a large quantity of an extremely fine powder which tends to become suspended in air for a long period of time. The airborne particles settle on everything in the vicinity of the sanding site and usually require several cleanings before they can all be collected, thereby making cleanup a time consuming and tedious process. The particles may also present a serious health hazard to the worker.

The airborne particles are highly pervasive and can enter the nose, lungs, eyes and even the pores of the skin. Results from a study conducted by the National Institute for Occupational Safety and Health found that dust levels in 9 out of 10 test samples taken at test sites where workers were finishing drywall with joint compound were higher than the limits set by OSHA. The report also said that the dust may not be safe even when it falls within the recommended limits. In addition, the study found that several dust samples contained silica and kaolin, material founds in clay that have been found to cause permanent lung damage. The report recommended the use of local exhaust ventilation, wet finishing techniques, and personal protective equipment to reduce the hazard.

In an effort to reduce the dust generation and cleanup problems associated with the sanding of conventional joint compounds, various attempts have been made to develop specialized dustless drywall sanders. The Matechuk U.S. Pat. No. 4,782,632, for example, discloses a drywall sander including a sanding head designed to minimize the release of dust and further discloses attaching a vacuum cleaner to the sanding head to collect the dust. The Krumholz U.S. Pat. No. 4,955,748 discloses a dustless drywall finisher which uses a wet sponge to prevent the formation of airborne dust.

Dust remains a problem, however, when conventional power sanders or hand sanders are used to sand conventional joint compounds. A need therefore exists for a joint compound that can be sanded using conventional sanders without producing a large quantity of fine particles capable of becoming suspended in air. It would also be desirable to provide an additive that could be mixed with commercially available joint compounds to inhibit the formation of airborne particles during the sanding procedure without otherwise interfering with the properties of the joint compound.

In order to address the dust problem, one may add a dust reduction additive to the joint compound. However, addition of the dust reduction additive that is of darker shade may darken the shade or tone of the joint compound. Another issue that needs consideration is the tendency of the dust reduction additive to foam. This invention combines the advantages of the dust reduction additive described infra without compromising on the color shade of the joint compound and with a reduced tendency to foam during addition to the aqueous medium. Clearly, the application of a non-foaming wax emulsion in a dust reduction situation would be desirable.

The composition of the present invention addresses the above discussed problems of dust generation. The nonfoaming emulsion of the present invention comprising colloidally-protected, wax-based microstructure (CPWB) can be added to a wall repair compound, for example, a joint compound to serve as a dust reduction additive that will not darken the joint compound to which it is added. In addition, this emulsion improves adhesion of the joint compound, and therefore, allows for a lowering of the binder to be used in the joint compound.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

This invention relates to a method of using joint compound composition that has low-dust property and improved adhesive property:
said method comprising:
(I) applying said composition to a joint between adjacent wallboard panels;
(II) allowing said composition to dry; and
(III) sanding said dried composition;
wherein said joint compound composition comprises:
  (a) a non-foaming dust reduction additive emulsion comprising colloidally-protected wax-based (CPWB) microstructures, wherein said CPWB microstructures comprise at least one polyhydric alcohol fatty acid ester (hereinafter PAFA ester carboxylate, and
  (b) a first water.

This invention further relates to the method described above, wherein said dust reduction additive emulsion comprises said CPWB microstructure comprising:
  (A) a wax core,
    wherein said wax core comprises a wax component and a tethering component,
    wherein said wax component comprises at least one linear alkane wax defined by the general formula $C_nH_{2n+2}$, where n ranges from 13-80,
    wherein said tethering component comprises at least one PAFA ester carboxylate, wherein said PAFA ester carboxylate fatty acid chain is from about 4 to about 100 carbon atoms, and
  (B) a polymeric shell,
    wherein said polymeric shell comprises at least one polymer selected from polyvinyl alcohol, polyvinyl alcohol copolymers, polyvinyl alcohol terpolymers, polyvinyl acetate, polyvinyl acetate copolymers, polyvinyl acetate terpolymers, cellulose ethers, polyethylene oxide, polyethyleneimines, polyvinylpyrrolidone, polyvinylpyrrolidone copolymers, polyethylene glycol, polyacrylamides and poly (N-isopropylamides), pullulan, sodium alginate, gelatin, starches, and combinations thereof.

This invention further relates to the methods described above, wherein said polymeric shell comprises polyvinyl alcohol.

This invention further relates to the methods described above, wherein said PAFA ester carboxylate has the polyhydric alcohol selected from glycol, glycerol, and polyethylene glycol.

This invention further relates to the methods described above, wherein said PAFA ester carboxylate has the fatty acid as stearic acid This invention further relates to the methods described above, wherein said dust-reduction additive emulsion further comprises a second water; a base; and a dispersant.

This invention further relates to the methods described above, wherein the weight of said dust reduction additive emulsion is in the range of from about 0.1% to about 20% by weight of said joint compound composition.

This invention further relates to the methods described above, wherein the quantity of dust generated upon sanding of said low-dust joint compound composition is reduced at least by 5%.

This invention further relates to the methods described above, wherein the quantity of dust generated upon sanding of said low-dust joint compound composition is reduced at least by 80%.

This invention further relates to the methods described above, wherein the quantity of dust generated by sanding said hardened drywall joint-compound is reduced by at least 80%.

This invention also relates to a non-foaming dust reduction additive emulsion comprising colloidally-protected wax-based (CPWB) microstructures, wherein said CPWB microstructures comprise:

(A) a wax core,
  wherein said wax core comprises a wax component and a tethering component,
  wherein said wax component comprises at least one linear alkane wax defined by the general formula $C_nH_{2n+2}$, where n ranges from 13-80,
  wherein said tethering component comprises at least one a PAFA ester carboxylate, wherein said PAFA ester carboxylate fatty acid chain is from about 4 to about 100 carbon atoms, and
(B) a polymeric shell,
  wherein said polymeric shell comprises at least one polymer selected from polyvinyl alcohol, polyvinyl alcohol copolymers, polyvinyl alcohol terpolymers, polyvinyl acetate, polyvinyl acetate copolymers, polyvinyl acetate terpolymers, cellulose ethers, polyethylene oxide, polyethyleneimines, polyvinylpyrrolidone, polyvinylpyrrolidone copolymers, polyethylene glycol, polyacrylamides and poly(N-isopropylamides), pullulan, sodium alginate, gelatin, starches, and combinations thereof.

This invention also relates to the non-foaming dust reduction additive emulsion described above, wherein said polymeric shell comprises polyvinyl alcohol.

This invention also relates to the non-foaming dust reduction additive emulsion described above, wherein said PAFA ester carboxylate has the polyhydric alcohol selected from glycol, glycerol, and polyethylene glycol.

This invention also relates to the non-foaming dust reduction additive emulsion described above, wherein said PAFA ester carboxylate has the fatty acid as stearic acid.

This invention also relates to the non-foaming dust reduction additive emulsion described above, wherein said dust-reduction additive emulsion further comprises a second water; a base; and a dispersant.

This invention also relates to the non-foaming dust reduction additive emulsion described above, wherein the weight of said dust reduction additive emulsion is in the range of from about 0.1% to about 20% by weight of said joint compound composition.

This invention also relates to the non-foaming dust reduction additive emulsion described above, wherein the quantity of dust generated upon sanding of said low-dust joint compound composition is reduced at least by 5%.

This invention also relates to the non-foaming dust reduction additive emulsion described above, wherein the quantity of dust generated upon sanding of said low-dust joint compound composition is reduced at least by 80%.

This invention also relates to a method of using said low-dust joint compound composition as recited above, said method comprising:

(I) applying said composition to a joint between adjacent wallboard panels;
(II) allowing said composition to dry; and
(III) sanding said dried composition.

This invention also relates to a joint compound comprising the dust reduction additives as described above.

BRIEF DESCRIPTION OF THE DRAWINGS

The disclosed aspects will hereinafter be described in conjunction with the appended drawings, provided to illustrate and not to limit the disclosed aspects, wherein like designations denote the elements.

DETAILED DESCRIPTION OF ILLUSTRATIVE EMBODIMENTS

Figure 1:
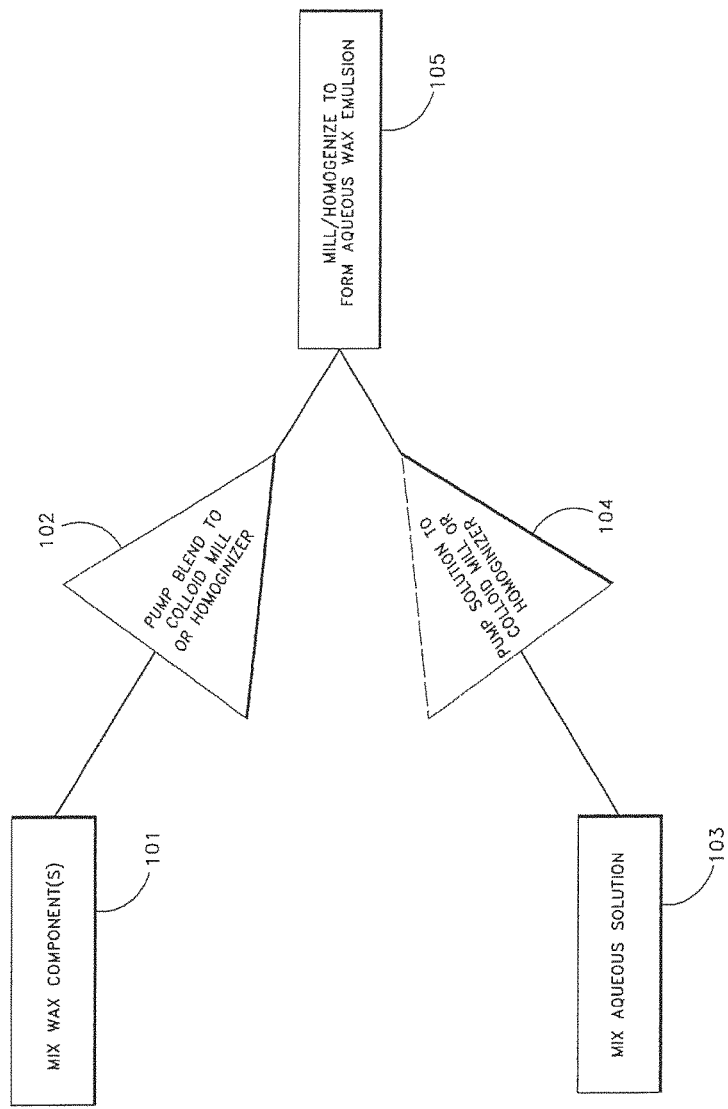
FIG. 1 illustrates an example process of one embodiment of the disclosure.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

General Embodiments

Embodiments of the present disclosure provide a dust reduction additive ("DRA") comprising colloidally-protected, wax-based ("CPWB") microstructures in an emulsion form. In another embodiment, the present invention relates to the process of preparing such dust reduction additive emulsions that also impart improved adhesive properties to the joint compound to which they are added, thereby lowering the binder requirement of the joint compound. The emulsion improves not only the dust reduction of the joint compound but also provides bond strength and adhesion of the joint compound to the substrate (e.g., wallboard and/or joint tape). In addition, the DRA of the present invention mostly retain the color tone of the joint compound without darkening the joint compound, and at the same time reduces the foaming in the dust reduction additive emulsion.

In another embodiment, the present invention relates to the process of preparing such dust reduction additives.

Dust reduction additive refers to any ingredient capable of preventing, minimizing, suppressing, reducing, or inhibiting the formation of particles capable of becoming airborne. The expressions "airborne particles" or "airborne dust particles" refer to fine particles generated during the sanding or abrading of the compound which are capable of being carried by or through the air. Wall repair compound refers generally to compositions useful for filling and repairing cracks, holes, and other imperfections in surfaces such as drywall, wood, plaster, and masonry. Wall repair compounds include interior finishing and patch compounds such as joint compound, spackling compound, wood fillers, plasters, stucco, and the like. The joint compound can also include a thickener, and other materials found in conventional joint compounds. While the disclosure infra describes the DRA of the present invention in the context of a joint compound, the DRA emulsion can also be used with other wall-repair compounds.

The present invention also relates to low-dust joint compounds comprising the dust reduction additive and methods for preparing such low-dust joint compounds. By "low-dust joint compound" is meant a joint compound comprising DRA emulsion in which the dust formation in form of airborne particles is lower than the same joint compound not comprising the DRA.

According to the present invention, there are provided joint compound compositions suitable for filling and repairing cracks, holes, or other imperfections in a wall surface, such as the joints between adjacent wallboard panels. The compositions of the present invention include a dust reduction additive combined with conventional wall repair compound materials including a filler and/or, a binder, and/or a thickener to form a low dust wall repair compound.

In addition to providing a low-dust property, the dust reduction additive compositions of the present invention also provide adhesive properties and color tone retention to the joint compound to which it is added.

The joint compound may be used to create a low-dust barrier at wall joints, as well as at holes, such as nail holes, through a wall, thereby reducing the dust generated during processing of the joint compound and preventing moisture from passing through the walls. The joint compound may be used, for example, in construction of houses or commercial buildings.

In one embodiment, the joint compound comprises the dust reduction additive that comprises an emulsion comprising the CPWB microstructures, wherein as the tethering component between the wax core and the polymeric shell is a carboxylate moiety of fatty acids such as saturated and unsaturated aliphatic monocarboxylic acids, and polyvinyl alcohol-stabilized wax emulsion described further below. The resulting dried joint compound surface can exhibit a low-dust environment and in some embodiments, and even a high contact angle. Further, the disclosed joint compound formed from a wax emulsion can avoid deleterious effects on key desirable performance properties of the joint compound such as adhesion. In addition, the joint compound does not result into a darker color tone from the addition of the dust reduction additive.

In accordance with a characterizing feature of the present invention, the joint compound comprises the DRA emulsion which minimizes the quantity of airborne particles generated, for example, during sanding of the hardened joint compound. The additive generally comprises less than 20% of the joint compound total wet weight. More preferably, the dust reduction additive comprises between about 0.1% and about 10% of the joint compound by wet weight percent and, most preferably, between about 0.5% and about 5% In one embodiment, the DRA is selected from any one of the following weight percentages: 0.1, 1, 2, 3, 4, 5, 6, 7, 8, 9, 10, 11, 12, 13, 14, 15, 16, 17, 18, 19, and 20.

The weight percentage of DRA emulsion in the joint compound can be any number within the range defined by any two numbers above, including the endpoints. The dust reduction additive of the present invention is described in detail infra.

Many ingredients have been found to effectively reduce the quantity of airborne particles generated when sanding the joint compound including oils such as animal, vegetable, and mineral oils (saturated and unsaturated), and oils derived from petroleum, pitch, natural and synthetic waxes, micro-crystalline-wax, solvents which evaporate slower than water, terpenes, glycols, surfactants, and mixtures thereof. However, the CPWB microstructure based DRA emulsion or the micro-crystalline wax based DRA of the present invention unlock the synergistic effect of the three desired properties in the joint compound, namely: dust reducing property and adhesion.

While the manner by which each additive serves to suppress the formation of particles capable of becoming airborne is not fully understood, some general observations have been made. It is possible that the dust reduction additive may cause the dust particles to agglomerate or stick together, thereby forming large heavy particles which tend not to become or remain airborne. The invention, however, is not intended to be limited to any particular mechanism.

Dust Reduction Additive

Definitions

For the purposes of this invention, a "colloidal dispersion" is a dispersion of a discontinuous phase in a continuous phase, comprising colloidally-protected wax-based microstructures.

By "wax" is meant any naturally occurring or synthetically occurring wax. It also includes blends or mixtures of one or more naturally occurring and/or synthetically occurring waxes. Those of animal origin typically consist of wax esters derived from a variety of carboxylic acids and fatty alcohols. The composition depends not only on species, but also on geographic location of the organism. Because they are mixtures, naturally produced waxes are softer and melt at lower temperatures than the pure components. Waxes are further discussed infra.

Micro-Crystalline-Wax

Generally, two chemically different waxy materials are extracted from crude oil: (1) paraffin wax or macro-wax; and (2) micro-crystalline-wax. Micro-crystalline wax is a refined mixture of solid, saturated aliphatic hydrocarbons. It is characterized by a higher molecular weight branched molecular structure, longer hydrocarbon chains, and higher naphthenic hydrocarbon content, compared to the paraffin wax that contains mostly unbranched alkanes.

The micro-crystalline wax crystal structure is much finer than paraffin wax, which directly impacts many of the physical properties. Typical micro-crystalline wax crystal structure is small and thin, making them more flexible than paraffin wax. The fine crystal structure also enables micro-crystalline wax to bind solvents or oil, and thus prevent the sweating-out of compositions. Also, the micro-crystalline wax contains a higher amorphous content compared to the paraffin wax.

Micro-crystalline waxes are produced by de-oiling heavy distillates such as petrolatum during petroleum refining. This by-product is then de-oiled at a wax refinery. Depending on the end use and desired specification, the product then may have its odor removed and color removed.

Micro-crystalline-waxes are tougher, more flexible and generally higher in melting point than paraffin wax. They are generally darker, more viscous, denser, tackier and more elastic than paraffin waxes, and have a higher molecular weight and melting point. The elastic and adhesive characteristics of micro-crystalline waxes are related to their non-straight chain components.

Micro-crystalline waxes when produced by wax refiners are typically produced to meet a number of ASTM specifications. These include congeal point (ASTM D938), needle penetration (D1321), color (ASTM D6045), and viscosity (ASTM D445). Micro-crystalline waxes can generally be put into two categories: "laminating" grades and "hardening" grades. The laminating grades typically have a melt point of 140-175 F (60-80 C) and needle penetration of 25 or above. The hardening grades will range from about 175-200 F (80-93 C), and have a needle penetration of 25 or below. Color in both grades can range from brown to white, depending on the degree of processing done at the refinery level.

Micro-crystalline wax is often used in making of tire and rubber, candles, adhesives, corrugated board, cosmetics, and castings. Micro-crystalline-waxes are excellent materials to use when modifying the crystalline properties of paraffin wax. The micro-crystalline wax has significantly more branching of the carbon chains that are the backbone of paraffin wax. This is useful when some desired functional changes in the paraffin are needed, such as flexibility, higher melt point, and increased opacity. They are also used as slip agents in printing ink.

TABLE 1

Comparison of Micro-crystalline and Paraffin Waxes

| Paraffin-Wax | Micro-crystalline-Wax |
| --- | --- |
| Mainly unbranched alkanes | Mainly branched alkanes |
| Crystalline | Amorphous |
| Brittle | Malleable |
| Translucent | Opaque |
| Low melting (48 to 70° C.) | Higher melting (54 to 95° C.) |

By "emulsion" or "wax-based emulsion" is meant an aqueous colloidally occurring dispersion or mixture in a liquid or paste-like form comprising wax materials, which has both the discontinuous and the continuous phases, preferably as liquid. For example, an aqueous wax system can either be a general colloid, or it can be an emulsion (which is a type of colloid), depending on the melt temperature of the emulsified wax versus the use temperature. In the disclosure below, the term "emulsion" is used. It should be noted, however, that a colloidal dispersion is also within the scope of the present invention.

By "colloidally-protected wax-based microstructure" (CPWB microstructure) is meant a colloidal dispersion or emulsion, wherein the microstructure is colloidally protected with a wax or a lower fraction hydrocarbon core. The microstructure can exist in a dispersion or emulsion form.

Colloidally-Protected Wax-Based Microstructures

This invention relates to DRA materials that comprise CPWB microstructures, preferably in an emulsion form. They have been alternatively called "CPWB microstructure based DRA emulsion," or "DRA emulsion," or "DRA emulsion comprising CPWB microstructure." CPWB microstructures have a wax core (paraffinic and/or microcrystalline) and film or casing of polymeric moieties tethered through carboxylate moiety of fatty acids such as saturated and unsaturated aliphatic monocarboxylic acids. The carboxylate moieties' tails are embedded in the wax core with their heads extending away from the core and adhered to the polymeric moieties via secondary forces such as hydrogen bonding or Van Der Waals forces as opposed to a mechanical shell over a core in a classical core-shell structure. CPWB microstructures are described in detail below. In the aqueous emulsion of the DRA comprising the CPWB microstructures, the core may be fully or partially encapsulated, in that the colloidal shell is not a physical shell like that of a typical core-shell structure. The DRA emulsion comprising CPWB microstructure provides low-dust property and adhesion property to the joint compound to which it is added.

CPWB Microstructure Shell

The polymers selected for the shell of the CPWB microstructures for low-dust joint compound applications are one or more of the following:

Polyvinyl alcohol and copolymers, cellulose ethers, polyethylene oxide, polyethyleneimines, polyvinylpyrrolidone, and copolymers, polyethylene glycol, polyacrylamides and poly (N-isopropylamides, pullulan, sodium alginate, gelatin, and starches. Polyvinyl alcohol and copolymers are preferred.

CPWB Microstructure Core

The core of the colloidally-protected wax-based microstructures can be a paraffin wax, micro-crystalline wax, or a blended wax thereof, as defined previously. In one embodiment, this invention also envisions a blend of micro-crystalline wax and paraffin-wax, wherein the micro-crystalline wax is at least 50% by weight of the combined content of the micro-crystalline wax and the paraffin-wax. The content of micro-crystalline wax in such a blend can be any one of the following numbers or an inclusive range defined by any two numbers expressed in percentage: 30, 35, 40, 45, 50, 55, 60, 65, 70, 75, 80, 85, 90, 95, and 100.

Preferably the core comprises the micro-crystalline wax in a substantial amount, for example, greater than 90%.

The melting point of core wax is lower than the melting point of the colloidally-protective polymeric shell.

Some embodiments of the present invention envision micro-crystalline wax that comprises branched structures as well as a blend or mixture of linear and branched structures of the micro-crystalline-wax. This invention also embodies mixtures or blends of waxes with two or more carbon numbers that may either be linear, branched, or blends of linear and branched structures. For example, a wax could be a mixture of $C_{15}$ linear and $C_{20}$ linear hydrocarbon alkane wax. In another example, the wax could be a mixture of $C_{16}$ linear and $C_{16}$ branched hydrocarbon alkane wax. In yet another example, the wax could be a mixture of $C_{15}$ linear, $C_{16}$ linear, and $C_{20}$ branched. In yet another example, the wax could be a mixture of $C_{18}$ linear, $C_{18}$ branched.

Waxes usable as core in the CPWB microstructure-based DRA emulsion of the present invention are described.

Tethering Component

The tethering component, which has its hydrophobic tail embedded in the wax core described previously, for the purposes of this invention is a carboxylate moiety derived from at least one polyhydric alcohol fatty acid esters (hereinafter PAFA ester carboxylate), which acts as emulsifier to the wax core.

Fatty acids for the PAFA ester purposes included for example, oleic, tall oil, lauric acid or stearic acid. The polyhydric alcohol, for example, can be a glycol, a glycerol, or polyethylene glycol liquid and solid polymers, of the general formula $H(OCH_2 CH_2)_n OH$, where n is between 3 to 10.

Preferred fatty acids include saturated and unsaturated aliphatic monocarboxylic acids of 4-100 carbon atoms and preferably 16-22 carbon atoms, for example, oleic, lauric tall oil, or stearic acid.

The PAFA ester carboxylate can also be used in combination with one or more of the other suitable wax components, it is preferred that PAFA ester carboxylate be present in an amount of about 0.1% to about 10%, more preferably about 1% to about 4% by weight of the wax emulsion with the remaining wax or waxes present in amounts of from about 30% to about 50%, more preferably about 30% to about 35% by weight of the wax.

The tethering component of the emulsion includes at least one wax which is the PAFA ester carboxylate, or a combination of PAFA ester carboxylate and slack wax. The total wax content may be about 30% to about 60%, more preferably about 30% to about 40% by weight of the emulsion. Slack wax may be any suitable slack wax known or to be developed which incorporates a material that is a higher petroleum refining fraction of generally up to about 20% by weight oil. In addition to, or as an alternative to slack wax, micro-crystalline-waxes of a more refined fraction are also useful within the scope of the invention.

Suitable micro-crystalline-waxes include waxes with melting points of from about 40° C. to about 110° C., although lower or higher melting points may be used if drying conditions are altered accordingly using any techniques known or yet to be developed in the composite board manufacturing arts or otherwise. Thus, micro-crystalline-waxes or less refined slack wax may be used. Optionally, synthetic waxes such as ethylenic polymers or hydrocarbon types derived via Fischer-Tropsch synthesis may be included in addition.

The wax emulsion used in the joint compound can be formed from slack wax, micro-crystalline-wax, carnauba wax, tall oil, sunflower wax, rice wax, and any other natural or synthetic wax containing organic acids and/or esters, or combinations thereof. For example, synthetic wax used in the joint compound may comprise ethylenic polymers or hydrocarbon types, optionally derived via Fischer-Tropsch synthesis, or combinations thereof. Optionally, the synthetic waxes can be added in concentrations ranging from about 0.1% to about 8% of the dry weight of the joint compound or from about 0.5% to about 4.0% of the dry weight of the joint compound. In some embodiments, the wax emulsion is stabilized by polyvinyl alcohol.

Theory for Colloidally Protected Wax-Based Microstructures

Generally speaking, two scientific theories have been proposed to explain the stability of CPWB microstructures that comprise the DRA emulsion materials of the present invention, namely, steric hindrance and electrostatic repulsion. Applicants do not wish to be bound by these theories, however. Applicants believe their invention relates to wax-based dispersions that may or may not relate to the two theories. It is possible that one or both theories or neither of the two may explain the CPWB microstructures of the present invention.

As described in FIG. 1, in the first step, a colloidally-protected wax based microstructure in an emulsion is prepared. The emulsion is prepared according to the specification for their use in variety of applications. For a general understanding of the method of making the exemplary wax emulsion, reference is made to the flow diagram in FIG. 1. As shown in 101, first the wax components may be mixed in an appropriate mixer device. Then, as shown in 102, the wax component mixture may be pumped to a colloid mill or homogenizer. As demonstrated in 103, in a separate step, water, and any emulsifiers, stabilizers, or additives (e.g., ethylene-vinyl alcohol-vinyl acetate terpolymer) are mixed. Then the aqueous solution is pumped into a colloid mill or homogenizer in 104. Steps 101 and 103 may be performed simultaneously, or they may be performed at different times. Steps 102 and 104 may be performed at the same time, so as to ensure proper formation of droplets in the emulsion. In some embodiments, steps 101 and 102 may be performed before step 103 is started. Finally, as shown in 105, the two mixtures from 102 and 104 are milled or homogenized to form an aqueous wax-based emulsion.

Figure 2:
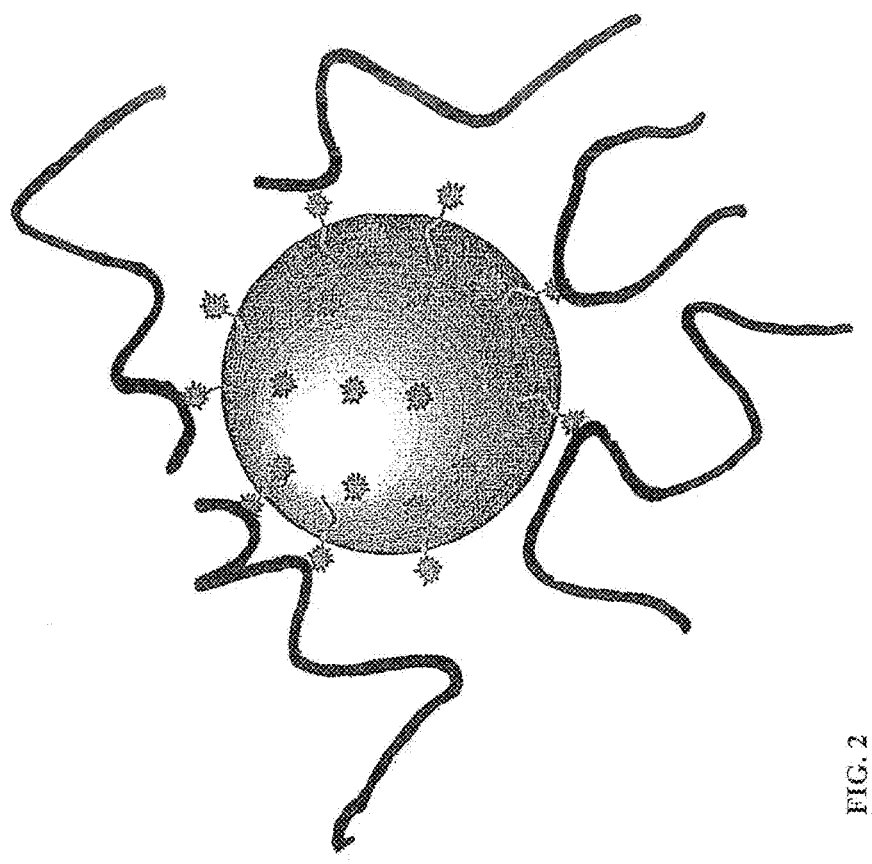
FIG. 2 describes the particle model of a unitary wax particle that has been stabilized in the colloidal dispersion.
Figure 2:
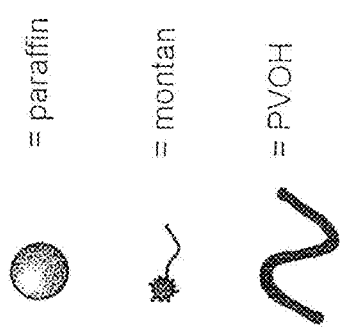

FIG. 2 describes the particle model of a unitary wax particle that has been stabilized in the colloidal dispersion. Applicants do not wish to be bound by the theory of the unitary wax particle stabilized in the dispersion. According to this model, the hydrophobic hydrocarbon "tail" of the emulsifier, that is, the carboxylate moiety of fatty acids such as saturated and unsaturated aliphatic monocarboxylic acids is embedded in the wax particle. The "head" of carboxylate moiety, which is hydrophilic is then tethered to polyvinyl alcohol by hydrogen bonding. The first mechanism by which many of the wax emulsions (colloidal dispersions) are stabilized is the steric hindrance mechanism. According to this mechanism, high molecular weight polymers (e.g. PVOH) are tethered to the outer surface of a wax particle and surround it. Due to steric hindrance, the PVOH molecules surrounding each wax particle then prevent adjacent micro-crystalline wax particles from coalescing.

Alternatively, electrostatic repulsion helps with the stabilization of the colloidal dispersions. In this mechanism, the polyhydric alcohol fatty acid ester (PAFA ester) which contains acid or ester groups, is first saponified with a base, converting the acid or ester groups to negatively charged carboxylate moieties. Because of their polar nature, these negatively charged carboxylate moieties exist at the water/wax interface, giving the surrounded wax particle a net negative charge. These negative charges on adjacent wax particles then constitute a repulsive force between particles that effectively stabilizes the dispersion (emulsion).

Thus, according to one model, as shown in FIG. 2, a wax particle is enclosed in a "web" of PVOH polymeric chains. This is not akin to a shell of a typical core-shell particle, but the PVOH loosely protects (colloidally protects) the micro-crystalline wax particle. One could envision the micro-crystalline wax particle as a solid ball or a nucleus surrounded by polymeric chains like strings.

Figure 3:
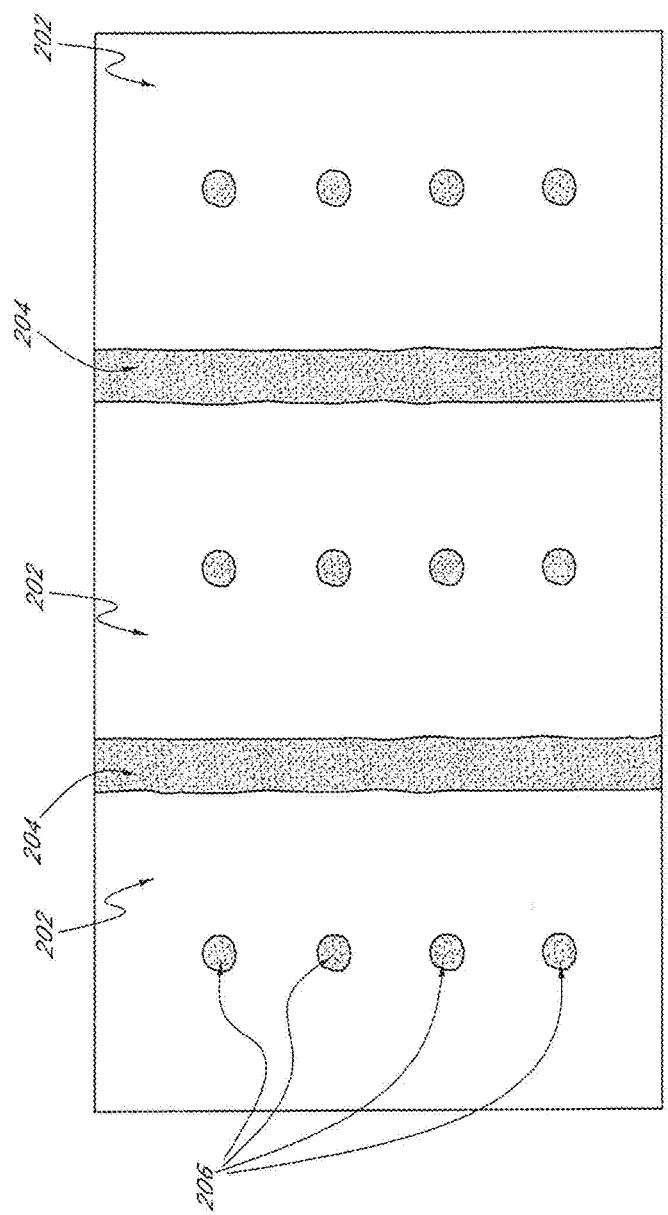
FIG. 3 illustrates a wall having an example embodiment of the disclosed joint compound applied thereon.
Figure 4:
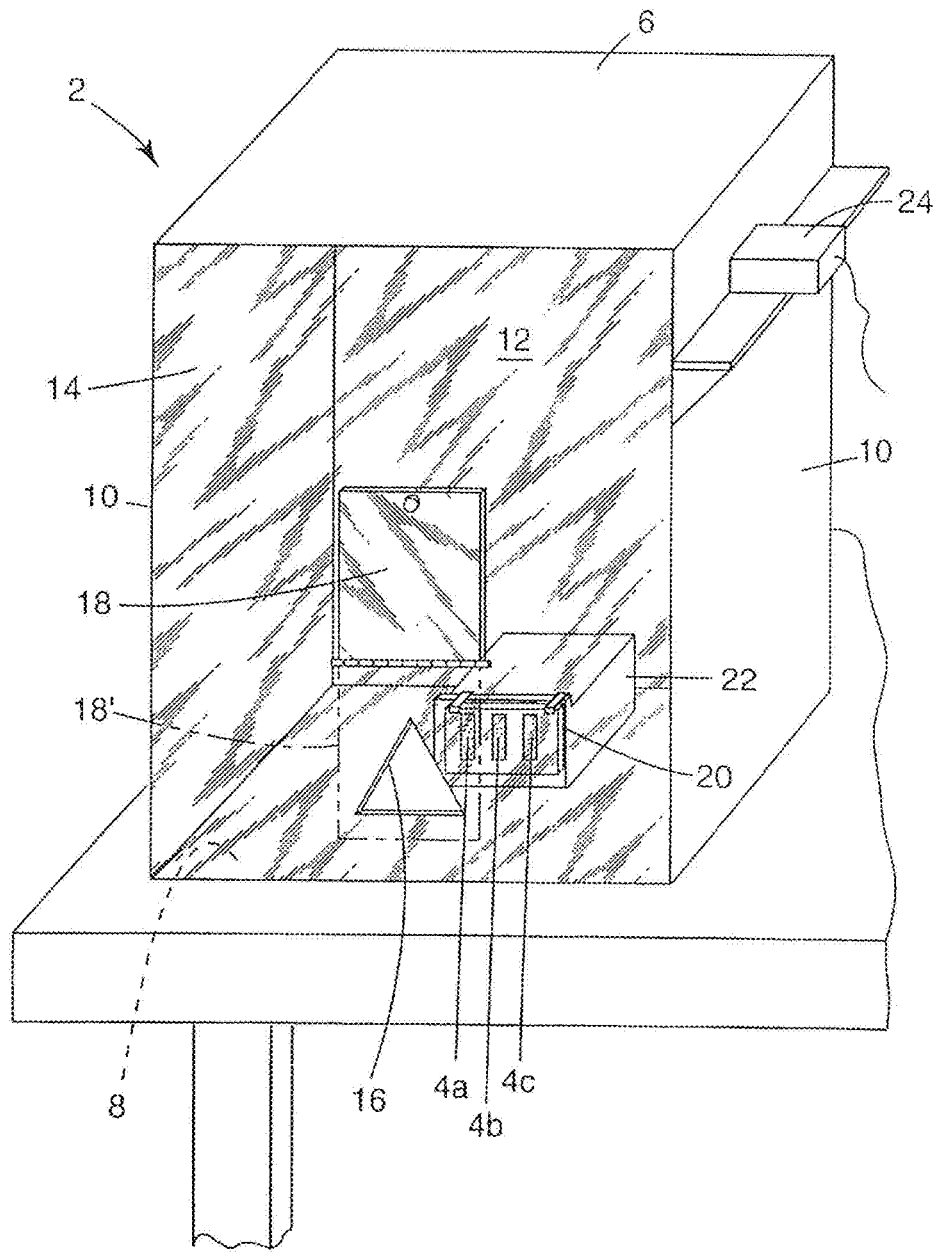
FIG. 4 shows the test enclosure used to sand test specimens and measure the quantity of airborne dust particles generated.
Figure 5:
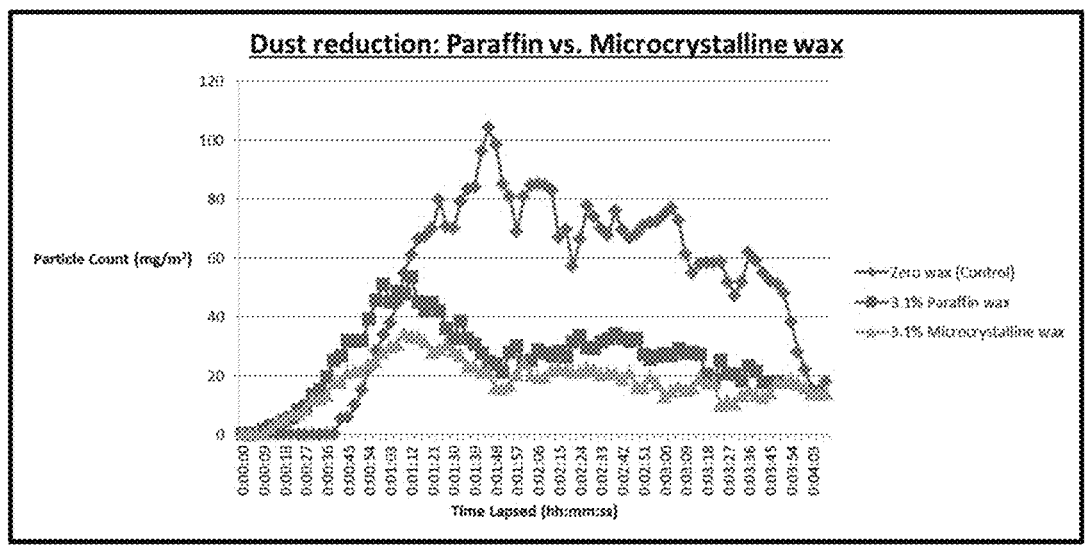
FIG. 5 shows comparison of air-borne numbers for a commercial sample, paraffin wax emulsion based dust reduction additive, and wax based dust reduction additive.
Figure 6:
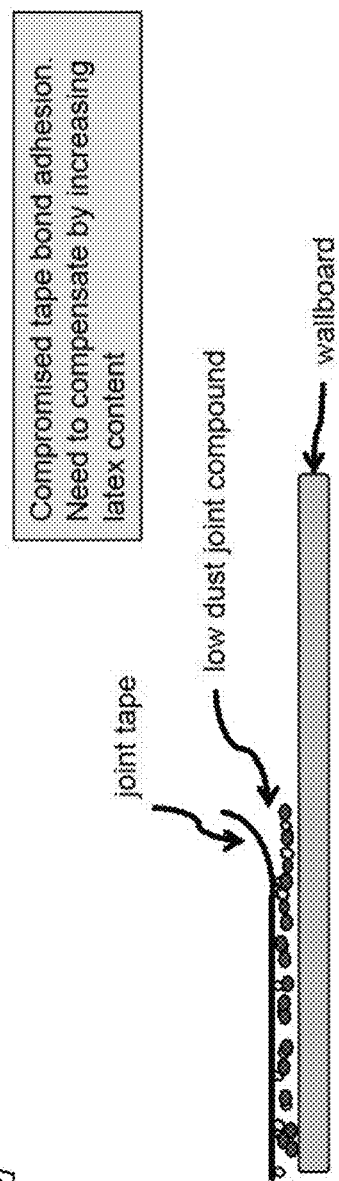
FIG. 6 is a schematic of currently available low dust technologies and its limitations.
Figure 6:
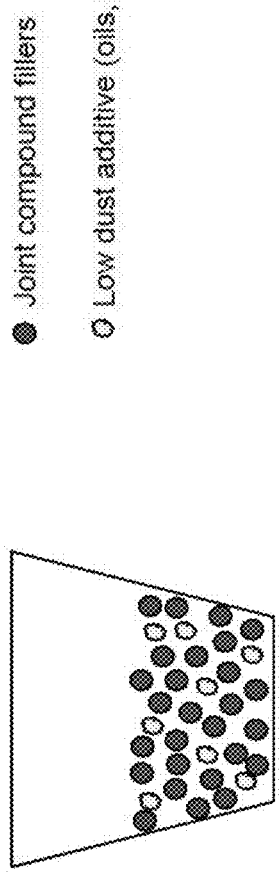
Figure 7:
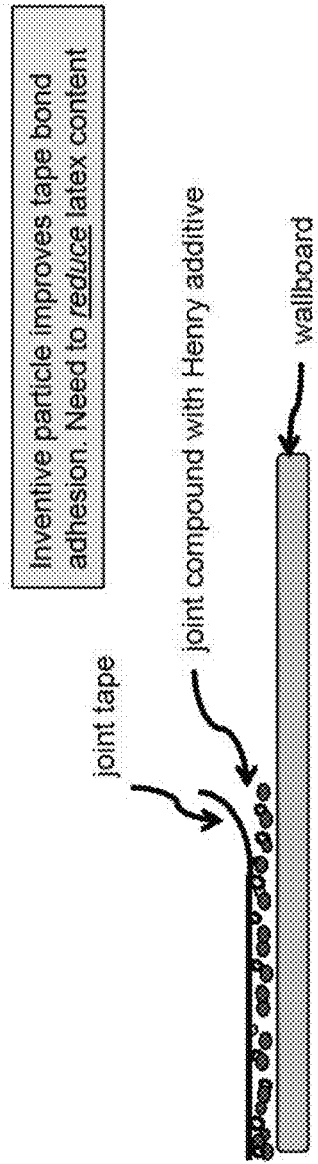
FIG. 7 is a schematic of the low dust technology of the present invention.
Figure 7:
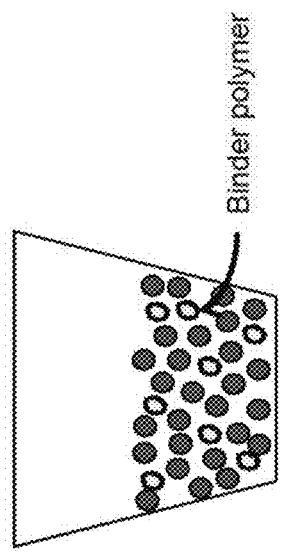
Figure 8:
FIG. 8 shows the dust-testing chamber used to evaluate the present invention.
Figure 8:
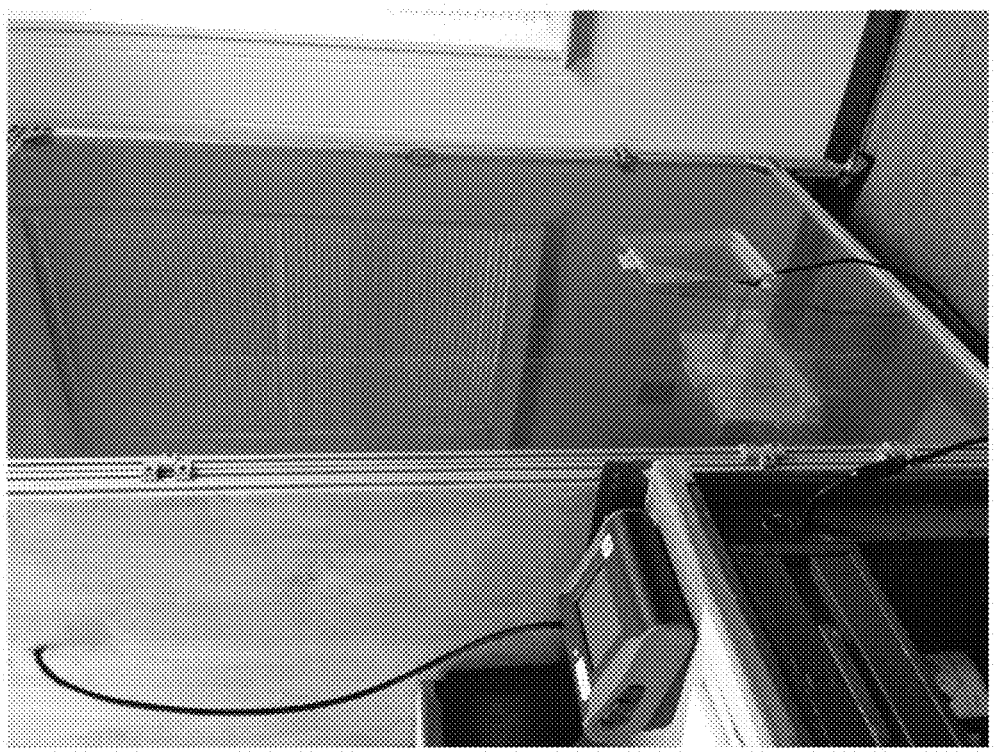
Figure 9:
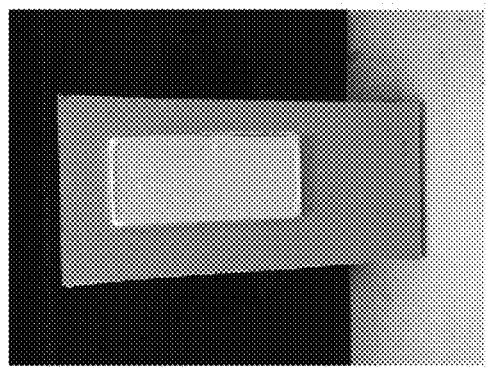
FIG. 9 shows the sample preparation of the low dust additive of the present invention.

In another embodiment, and as shown in FIGS. 3 and 4, the polymer, for example PVOH, forms a shell like physical film or casing such as a film (PVOH is an excellent film former), the casing herein is based on secondary forces of attraction, e.g., Van der Waals forces. Hydrogen bonding may also be one of the forces for the encapsulation of the PVOH of the wax particles. Applicants do not wish to be bound by this theory. However, the model does explain the wax particle with the PVOH casing over it. In the above examples, PVOH is used as an exemplary polymeric system. However, other polymeric systems used herein, or their combinations can also be used to prepare the colloidally-protected wax-based microstructures.

Dust Reduction Additive Emulsion

Exemplary emulsion comprising CPWB microstructure for use in, for example, as a dust reduction additive (and for water-resistance) in a joint compound are now described in greater detail, as follows.

In one embodiment, the emulsion comprising CPWB microstructures may comprise water, a base, one or more waxes optionally selected from the group consisting of PAFA ester, wax, and a polymeric stabilizer, such as ethylene-vinyl alcohol-vinyl acetate terpolymer or polyvinyl alcohol. Further, carnauba wax, sunflower wax, tall oil, tallow wax, rice wax, and any other natural or synthetic wax or emulsifier containing organic acids and/or esters can be used to form the wax emulsion.

Water may be provided to the emulsion, for example in amounts of about 30% to about 60% by weight of the emulsion. The solids content of the wax emulsion is preferably about 40% to about 70% by weight of the emulsion. Other amounts may be used.

The present invention relates to a dust reduction additive that comprises an emulsion comprising a carboxylate moiety derived from polyhydric alcohol fatty acid ester (PAFA ester). The PAFA ester functions as an emulsifier of the wax (paraffin or micro-crystalline wax). According to one theory, the PAFA ester in the basic emulsion medium undergoes hydrolysis to form the polyhydric alcohol and the fatty acid. The fatty acid is deprotonated to form a carboxylate moiety of the fatty acid. This carboxylate moiety tail is embedded into the wax particle, while its head, which is now negatively charged, helps with its tethering to the polyvinyl alcohol. As shown in FIG. 2, the polyvinyl alcohol polymeric chains are tethered to the carboxylate moiety of fatty acid. The PVA provides the emulsification function through steric hindrance or as described previously, through electrostatic repulsion.

The free polyhydric alcohol, in the aqueous medium, acts as a foam reducing agent. Generally, speaking, if the fatty acid instead of the PAFA ester is used as emulsifier in the dust reduction additive, it will demonstrate a tendency to foam. But in the present invention, the foaming aspect is mitigated by the presence of the polyhydric alcohol, for example, glycerol, which is known for its defoaming properties.

Using montan as an emulsifying agent gives a rather dark color tone to the dust reduction additive, which then can dull the joint compound. On the other hand, using fatty acids including the saturated and unsaturated aliphatic monocarboxylic acids, have a lighter color tone, thereby eliminating the darkness of the joint compound. Fatty acids for the PAFA ester purposes included for example, oleic, tall oil, lauric acid or stearic acid. The polyhydric alcohol, for example, can be a glycol, a glycerol, or polyethylene glycol liquid and solid polymers, of the general formula $H(OCH_2 CH_2)_n OH$, where n is between 3 to 10.

Preferred fatty acids include saturated and unsaturated aliphatic monocarboxylic acids of 4-100 carbon atoms and preferably 16-22 carbon atoms, for example, oleic, lauric tall oil, or stearic acid.

In some embodiments, a dispersant and/or a surfactant may be employed in the wax emulsions. Optional dispersants, include, but are not limited to those having a sulfur or a sulfur-containing group(s) in the compound such as sulfonic acids ($R-S(=O)_2-OH$) and their salts, wherein the R groups may be otherwise functionalized with hydroxyl, carboxyl or other useful bonding groups. In some embodiments, higher molecular weight sulfonic acid compounds such as lignosulfonate, lignosulfonic acid, naphthalene sulfonic acid, the sulfonate salts of these acids, and derivatized or functionalized versions of these materials are used in addition or instead. An example lignosulfonic acid salt is Polyfon® H available from MeadWestvaco Corporation, Charleston, S.C. Other dispersants may be used, such as magnesium sulfate, polycarboxylate technology, ammonium hepta molybdate/starch combinations, non-ionic surfactants, ionic surfactants, zwitterionic surfactants and mixtures thereof, alkyl quaternary ammonium montmorillonite clay, etc. Similar materials may also be used, where such materials may be compatible with and perform well with the formulation components.

In one embodiment, a dispersant and/or surfactant may comprise about 0.01% to about 5.0% by weight of the wax emulsion formulation composition, preferably about 0.1% to about 2.0% by weight of the wax emulsion formulation composition. Other concentrations may be used.

In some embodiments, the wax emulsion includes polyvinyl alcohol (PVOH) of any suitable grade which is at least partially hydrolyzed. The preferred polyvinyl alcohol is at least 50%, and more preferably at least 90%, and most preferably about 97-100% hydrolyzed polyvinyl acetate. The PVA can be hydrolyzed to the extent defined by the percentage numbers below: 50, 55, 60, 65, 70, 75, 80, 85, 90, 95, and 100.

The PVA can also be hydrolyzed up to the extent of a number that resides in the range defined by any two numbers above, including the endpoints.

Suitably, the polyvinyl alcohol is soluble in water at elevated temperatures of about 60° C. to about 95° C., but insoluble in cold water. The hydrolyzed polyvinyl alcohol is preferably included in the emulsion in an amount of up to about 5% by weight, preferably 0.1% to about 5% by weight of the emulsion, and most preferably about 2% to about 3% by weight of the wax emulsion.

In some embodiments, the stabilizer comprises a polymer that is capable of hydrogen bonding to the carboxylate or similar moieties at the water/wax interface. Polymers that fit the hydrogen-bonding requirement would have such groups as hydroxyl, amine, and/or thiol, amongst others, along the polymer chain. Reducing the polymer's affinity for water (and thus, its water solubility) could be achieved by inserting hydrophobic groups such as alkyl, alkoxy silanes, or alkyl halide groups into the polymer chain. The result may be a polymer such as ethylene-vinyl acetate-vinyl alcohol terpolymer (where the vinyl acetate has been substantially hydrolyzed). The vinyl acetate content may be between 0% to 15%. In some embodiments, the vinyl acetate content is between 0% and 3% of the terpolymer chain. The ethylene-vinyl alcohol-vinyl acetate terpolymer may be included in the emulsion in an amount of up to about 10.0% by weight, preferably 0.1% to about 5.0% by weight of the emulsion. In some embodiments, ethylene-vinyl alcohol-vinyl acetate terpolymer may be included in the emulsion in an amount of about 2% to about 3% by weight of the wax emulsion. An example ethylene-vinyl alcohol-vinyl acetate terpolymer that is available is the Exceval AQ4104™, available from Kuraray Chemical Company.

The dust reduction additive, the emulsion comprising CPWB microstructures may include a stabilizer material (e.g., PVOH, ethylene-vinyl alcohol-vinyl acetate terpolymer as described above). The stabilizer may be soluble in water at elevated temperatures similar to those disclosed with reference to PVOH (e.g., about 60° C. up to about 95° C.), but insoluble in cold water. The active species in the wax component may be the carboxylic acids and esters, which may comprise as much as 90% of the wax. These chemical groups may be converted into carboxylate moieties upon hydrolysis in a high pH environment (e.g., in an environment including aqueous KOH). The carboxylate moieties may act as a hydrophilic portion or "head" of the molecule. The hydrophilic portions can directly interface with the surrounding aqueous environment, while the rest of the molecule, which may be a lipophilic portion or "tail", may be embedded in the hydrocarbon wax.

A stabilizer capable of hydrogen bonding to carboxylate moieties (e.g., PVOH or ethylene-vinyl alcohol-vinyl acetate terpolymer as described above) may be used in the wax emulsion. The polar nature of the carboxylate moiety may offer an optimal anchoring point for a stabilizer chain through hydrogen bonding. When stabilizer chains are firmly anchored to the carboxylate moieties as described above, the stabilizer may provide emulsion stabilization through steric hindrance. In embodiments where the emulsion comprising CPWB microstructures is subsequently dispersed in a wallboard (e.g., gypsum board) system, all the water may be evaporated away during wallboard manufacture. The stabilizer may then function as a gate-keeper for repelling moisture. Decreasing the solubility of the stabilizer in water may improve the moisture resistance of the wax emulsion and the wallboard. For example, fully hydrolyzed PVOH may only dissolve in heated, and not cool, water. For another example, ethylene-vinyl alcohol-vinyl acetate terpolymer may be even less water soluble than PVOH. The ethylene repeating units may reduce the overall water solubility. Other stabilizer materials are also possible. For example, polymers with hydrogen bonding capability such as those containing specific functional groups, such as alcohols, amines, and thiols, may also be used. For another example, vinyl alcohol-vinyl acetate-silyl ether terpolymer can be used. An example vinyl alcohol-vinyl acetate-silyl ether terpolymer is Exceval R-2015, available from Kuraray Chemical Company. In some embodiments, combinations of stabilizers are used.

In some embodiments, the emulsion comprising CPWB microstructures comprises a base. For example, the wax emulsion may comprise an alkali metal hydroxide, such as potassium hydroxide or other suitable metallic hydroxide, such as aluminum, barium, calcium, lithium, magnesium, sodium and/or zinc hydroxide. These materials may serve as saponifying agents. Non-metallic bases such as derivatives of ammonia as well as amines (e.g., diethanolamine or triethanolamine) can also be used. Combinations of the above-mentioned materials are also possible. If included in the wax emulsion, potassium hydroxide is preferably present in an amount of 0% to 1%, more preferably about 0.1% to about 0.5% by weight of the wax emulsion.

In some embodiments, an exemplary emulsion comprising CPWB microstructures comprises: about 30% to about 60% by weight of water; about 0.1% to about 5% by weight of a lignosulfonic acid or a salt thereof; about 0% to about 1% by weight of potassium hydroxide; about 30% to about 50% by weight of wax selected from the group consisting of paraffin wax, slack wax and combinations thereof; and about 0.1% to about 10% PAFA ester carboxylate wax, and about 0.1 to 5% by weight of ethylene-vinyl alcohol-vinyl acetate terpolymer.

The emulsion comprising CPWB microstructures may further include other additives, including without limitation additional emulsifiers and stabilizers typically used in wax emulsions, flame retardants, lignocellulosic preserving agents, fungicides, insecticides, biocides, sizing agents, fillers, binders, additional adhesives and/or catalysts. Such additives are preferably present in minor amounts and are provided in amounts which will not materially affect the resulting composite board properties. Preferably no more than 30% by weight, more preferably no more than 10%, and most preferably no more than 5% by weight of such additives are present in the wax emulsion.

Shown in the tables below are exemplary embodiments of a wax emulsion comprising CPWB microstructures, although other quantities in weight percent may be used.

TABLE 2

First Exemplary Embodiment of Dust Reduction Additive Emulsion

| Raw Material | Quantity in Weight Percent |
| --- | --- |
| Water | 58 |
| Polyvinyl alcohol | 2.70 |
| Dispersant (Optional) | 1.50 |
| Micro-crystalline Wax | 34.30 |

TABLE 2-continued

First Exemplary Embodiment of Dust Reduction Additive Emulsion

| Raw Material | Quantity in Weight Percent |
| --- | --- |
| PAFA ester Carboxylate | 3.50 |
| Biocide | 0.02 |

TABLE 3

Second Exemplary Embodiment of Dust Reduction Additive Emulsion

| Raw Material | Quantity in Weight Percent |
| --- | --- |
| Water | 58.80 |
| Polyvinyl alcohol | 2.80 |
| Diethanol Amine | 0.04 |
| Micro-crystalline Wax | 34.80 |
| PAFA Ester Carboxylate | 3.50 |
| Biocide | 0.10 |

TABLE 4

Exemplary Embodiment of Dust Reduction Additive Emulsion

| Raw Material | Quantity in Weight by parts |
| --- | --- |
| Water | 60.1 |
| Polyvinyl alcohol (Kuraray Mowiol 10-98) | 4.1 |
| Glyceryl monostearate | 1.2 |
| ProWax 390 Microcrystalline Wax (Exxon Mobil) | 34.2 |
| Stearic acid | 0.1 |
| Potassium Hydroxide | 0.3 |
| Thor CBM-2 (biocide) | 0.10 |
| Total | 100.1 |
| Theoretical solids % | 39.7% |
| Viscosity (Cps, rV Spindle #2, 50 rpm) | 850 |
| pH | 9.5 |

In the above example of Table 4, glyceryl monostearate is used as an emulsifier. Glyceryl monostearate gets hydrolyzed in the basic medium and produces glycerol, which helps mitigate the foaming, resulting in a non-foaming wax emulsion. The range of anti-foam agent that is used is from about 0.1% to about 2%. A non-foaming wax emulsion is more desirable that the one with propensity to foam. Clearly, the application of such wax emulsion in a dust reduction situation would be desirable.

The emulsion comprising CPWB microstructures may be prepared using any acceptable techniques known in the art or to be developed for formulating wax emulsions, for example, the wax(es) are preferably heated to a molten state and blended together (if blending is required). A hot aqueous solution is prepared which includes any additives such as emulsifiers, stabilizers, etc., ethylene-vinyl alcohol-vinyl acetate terpolymer (if present), potassium hydroxide (if present) and lignosulfonic acid or any salt thereof. The emulsifiers may also optionally be mixed with the wax blend. The wax is then metered together with the aqueous solution in appropriate proportions through a colloid mill or similar apparatus to form a wax emulsion, which may then be cooled to ambient conditions if desired.

Some or all steps of the above method may be performed in open vessels. However, the homogenizer may use pressure in its application.

Advantageously in some embodiments, the emulsion, once formed, is cooled quickly. By cooling the emulsion quickly, agglomeration and coalescence of the wax particles may be avoided.

In some embodiments the wax mixture and the aqueous solution are combined in a pre-mix tank before they are pumped into the colloid mill or homogenizer. In other embodiments, the wax mixture and the aqueous solution may be combined for the first time in the colloid mill or homogenizer. When the wax mixture and the aqueous solution are combined in the colloid mill or homogenizer without first being combined in a pre-mix tank, the two mixtures may advantageously be combined under equivalent or nearly equivalent pressure or flow rate to ensure sufficient mixing.

In some embodiments, once melted, the wax emulsion is quickly combined with the aqueous solution. While not wishing to be bound by any theory, this expedited combination may beneficially prevent oxidation of the wax mixture.

Low Dust Joint Compound

Embodiments of the disclosed CPWB microstructure based dust reduction additive emulsion can be used to form a low-dust joint compound. The joint compound can be used to cover, smooth, or finish gaps in boards, such as joints between adjacent boards, screw holes, and nail holes.

The joint compound can also be used for repairing surface defects on walls and applying texture to walls and ceilings amongst numerous other applications. The joint compound comprises a filler material.

Fillers

Any conventional filler material can be used in the present invention. Suitable fillers include calcium carbonate ($CaCO_3$) and calcium sulfate dihydrate ($CaSO_4\ 2H_2O$ commonly referred to as gypsum) for ready mixed type joint compounds, and calcium sulfate hemihydrate ($CaSO_4$-½ $H_2O$) for setting type joint compounds. The joint compound can also include one or more secondary fillers such as glass micro bubbles, mica, perlite, talc, limestone, pyrophyllite, silica, and diatomaceous earth. The filler generally comprises from about 25% to about 95% of the weight of the joint compound based on the total wet weight of the formulation (i.e., including water). More preferably, the filler comprises from about 55% to about 75% of the total wet weight, and most preferably, from about 60% to about 70%.

When the joint compound to be made is a drying type formulation, the amount of filler varies from about 50% to about 98%. The preferred filler is calcium carbonate in amounts of from about 65% to about 93% by weight of the dry mix for a drying type. Gypsum, or calcium sulfate dihydrate, is also useful as filler in drying type joint compounds. Calcined gypsum, or calcium sulfate hemihydrate, a preferred filler for setting type formulas, is used in any suitable amount. Preferably, the calcined gypsum is present in an amount ranging from about 50% to about 93% by weight of the dry composition, more preferably, from about 55% to about 75% by weight of the dry composition. A setting type joint compound could be based on either an alpha or beta type calcium sulfate hemihydrate. In addition to the calcined gypsum, calcium carbonate may be used in amounts of from about 0% to about 30% by weight of the dry mix for a setting type joint compound.

Additional fillers are also used to impart specific properties to the joint compounds. Mica, talc, diatomaceous earth, clays, such as attapulgite, sepiolite and kaolin, calcium sulfate dihydrate, calcium sulfate anhydrite, and pyrophyllite are also suitable. Mica aids in reduced cracking of the joint compound as it dries, and is preferred in amounts of up to 25%. It is also preferred to add clay in amounts of up to about 10% to improve the body and workability of the joint compound, and as a rheology modifier. Carbonates are preferably added to setting type joint compounds, as well as being the preferred filler in a drying type joint compound as a bulking agent. The ratio of all fillers to all binders is preferably in the range of from about 15:1 to about 5:1.

Perlite or expanded perlite is a lightweight filler that may be used where the weight of the compound is important. Use of expanded perlite in a lightweight joint compound is taught in U.S. Pat. No. 4,454,267, which is herein incorporated by reference. Expanded perlite is a very lightweight material that contains many cracks and fissures. It should be treated according to the teachings of U.S. Pat. No. 4,525,388, which is hereby incorporated by reference, so that the material does not increase in weight due to water absorbed by capillary action. The treated, expanded perlite, when used, is preferably present in concentrations of at least 5% based on the weight of all ingredients of the joint compound, excluding water.

The joint compound of the present invention optionally includes resin microspheres as one of the fillers to be used in place of or in addition to expanded perlite in lightweight formulations. Preferred shell resins suitable for use in the present invention are homopolymers, copolymers, or blends of homopolymers and/or copolymers formed one or more of acrylonitrile ("ACN"), vinylidene chloride ("VDC"), or methyl methacrylate ("MMA") monomers. Particularly preferred resins are polyacrylonitrile ("PACN"), polyvinylidene chloride ("PVDC"), copolymers formed from ACN and VDC, and copolymers found from ACN, VDC, and MMA. The microspheres demonstrate high resiliency to compression without collapse (non-friable) and are able to withstand the exerted shear stress (shear-stability) of a typical joint treatment manufacturing process and subsequent customer preparation.

The preferred density of the microspheres is about 0.56 $lb/ft^3$ (0.009 g/cc) to about 8.1 $lb/ft^3$ (0.13 g/cc). Microspheres in this density range have an optimal effect on increasing the overall volume of the joint compound. However, they are still heavy enough to allow measurement and addition of the microspheres by weight. A lightweight joint compound utilizing resin microspheres and a method of making it are disclosed in U.S. Ser. No. 09/724,736, which is herein incorporated by reference.

The joint compound can also include one or more secondary fillers such as glass micro bubbles, mica, perlite, talc, limestone, pyrophyllite, silica, and diatomaceous earth. The filler generally comprises from about 25% to about 95% of the weight of the joint compound based on the total wet weight of the formulation (i.e. including water). More preferably, the filler comprises from about 55% to about 75% of the total wet weight, and most preferably, from about 60% to about 70%.

In some embodiments, fillers can be used in the joint compound. For example, calcium carbonate, calcium sulfate hemihydrate, or calcium sulfate dehydrate can all be used as fillers, though other materials can be used as well. Further, thickeners, preservatives, binders, and other additives can be incorporated into the joint compound.

Binders

Another ingredient usually present in joint compounds is a binder or resin. Any binder that is suitable for use in a joint compound is appropriate for use in the present invention. The binder is used to enhance the adhesion of the joint compound to its substrate, typically drywall. Suitable binders include polyvinyl acetate, polyvinyl alcohol, ethylene vinyl acetate co-polymer, vinylacrylic co-polymer, styrenebutadiene, polyacrylamide, other acrylic polymers, other latex emulsions, natural and synthetic starch, and casein. These binders can be used alone or in combination with one another. Acceptable binders include, but are not limited to latex emulsions or spray dried powders; including polyvinyl acetates, polyvinylacrylics and ethylene vinyl acetate latexes; and dispersible powders such as polyvinyl acetates, polyvinyl alcohols, polyvinyl acrylics, ethylene vinyl acetates, vinyl chlorides, styrene acrylics and starches, or combinations (blends and/or copolymers) thereof.

Preferred binders are soft and pliable rather than being extremely hard. Hard binders are likely to create more fine dust particles compared to pliable polymers. Latex binders are most preferred in the present invention. The concentration of the latex binder in a conventional weight joint compound of the invention (14 lbs./gal. density) ranges from about 1% to about 2.5% of the total dry weight. The concentration of binder in a lightweight joint compound ranges from 2% to about 6% of the dry weight. In the present invention, the concentration of the latex binder ranges preferably from about 1% to about 3.5%. As a result of the dust reduction additive comprising CPWB microstructures, a reduction in binder usage up to almost 100% is possible. Thus by including the DRA, the binder use can be reduced by the following percentage dry weight of the joint compound:

1, 5, 10, 14, 15, 20, 25, 30, 35, 40, 45, 50, 55, 60, 65, 70, 75, 80, 85, 90, 95, 100.

The weight of the binder can be reduced by a percentage number within a range described by any two numbers above. More preferably, the binder comprises from about 1% to about 20% of the total wet weight, and most preferably, from about 4% to about 14%. Preferred binders are Rhoplex HG 74M and Rhoplex AC 417M acrylic copolymers available from Rohm and Haas, Philadelphia, Pa.

In some embodiments, binders can be used in a joint compound to, for example, improve bonding to the substrate such as wallboard.

Thickeners

Starch may be added to the joint compound in amounts up to about 5% by weight of the dry ingredients to provide good adhesion and increase surface hardness. Starch also can function as a water retention aid, thickener and internal binder. Preferred starches are usually pregelatinized for lump-free incorporation into the joint compound.

Bonding between the joint compound and the substrate is improved by the addition of thickeners, plasticizers and/or polyvinyl alcohol powder. Thickening agents also are added to the joint compound of the present invention for other reasons. After water is added to the composition, the thickener becomes hydrated and swells, thereby thickening the composition. Thickeners are useful, for example, in helping to create the body and flow properties commonly associated with joint compounds. Desirably, the thickener is selected so that it substantially hydrates during the mixing process after water is added to the composition, with little or no hydration of the thickener occurring after mixing is completed, to prevent formation of lumps in the joint compound.

Suitable thickening agents include hydroxypropylmethylcellulose, hydroxyethylcellulose, cellulose-based gums, such as xanthan, arabic, alginate, pectin and guar gums, either alone or in combination. Cellulosic thickeners are preferred, with BERMOCOLL® providing the best results. Many conventional cellulosic thickeners, such as ethylhydroxy ethylcellulose, hydroxypropyl methylcellulose, methyl hydoxypropyl cellulose and hydroxyethyl cellulose, are also suitable in the joint compounds of this invention. The concentration of cellulosic thickener ranges from about 0.05% to about 2% of the dry weight of the joint compound ingredients. Preferably, it is present in an amount of from about 0.1% to about 1.0%.

Many joint compound formulations also contain a cellulosic thickener, usually a cellulosic ether. Suitable thickeners include methyl cellulose, hydroxypropyl cellulose, hydroxypropyl methyl cellulose, hydroxyethyl cellulose, hydroxyethyl methyl cellulose, hydroxyethyl hydroxypropyl cellulose, ethylhydroxyethyl cellulose, and sodium carboxymethyl cellulose (CMC). These thickeners can be used alone or in combination with one another. The amount of cellulosic thickener can range from about 0.1% to about 2% by weight of the joint compound. A preferred thickener is hydroxypropyl methyl cellulose available from Dow Chemical Company under the trade designation Methocel®.

In some embodiments, clay can be used in a joint compound as, for example, a non-leveling agent and/or a thickening agent that can control the viscosity or rheology of the final product. Clay can also help enhance or create the water-holding properties of the joint compound.

In some embodiments, thickeners can be used to control the viscosity, affect the rheology, and affect the water holding characteristics of a joint compound. For example, cellulose ether can be used as a thickener.

Other Additives

Set control additives or chelating agents are also added to setting type formulations to control set initiation or rate during the shelf life and use of the product. Preferred set control additives include, but are not limited to potassium sulfate, calcium sulfate, aluminum sulfate, boric acid, sodium citrate, citric acid, tartrates, or proteinaceous materials, or the like, and combinations thereof. Those skilled in the art will recognize that the choice of set control additive and the concentration depends on the desired hydration time and hydration rate.

When the setting type, ready mix joint compound is to be applied, a catalyst is used to overcome the suspended set state and initiate the hydration reactions. Preferably, a zinc salt catalyst is used, as taught in U.S. Pat. No. 5,746,822, which is herein incorporated by reference. If a setting type, ready-mix joint compound is utilized without the catalyst, it functions as a drying type joint compound.

The use of a trimetaphosphate ion is also contemplated for use with this invention. Setting type joint compounds utilizing trimetaphosphate ions have enhanced green strength, final strength or both. However, since the trimetaphosphate ion is unstable at high pH, it is preferable to maintain the pH below 9 in compositions where trimetaphosphate ions are used. Use of trimetaphosphate salts in joint compounds is disclosed in U.S. Ser. No. 09/718,279, filed Nov. 22, 2000, herein incorporated by reference.

Other preferred additives of the present joint compound include surfactants, wetting agents, soaps and alkyl benzene sulfonates. A soap, or detergent, is a complex mixture of ingredients including, but not limited to acids, bases, antimicrobial agents, antiredeposition agents, colorants, fragrances, defoamers, foaming agents, hydrotropes, moisturizers, preservatives, solvents, thickeners or surfactants, selected from many possible functional groups. Alkyl benzene sulfonate is a specific surfactant that is particularly useful in formulations of this nature, as taught in co-pending U.S. application Ser. No. 09/724,674, filed Nov. 29, 2000, for a Joint Compound Additive for Reduction of Cracking, Cratering and Shrinkage, which is herein incorporated by reference. The preferred joint compound of this invention utilizes sodium dodecyl benzene sulfonate to improve several properties of the joint compound including, crater resistance, crack resistance, and shrinkage reduction. In lightweight joint compounds, soaps and alkyl benzene sulfonates also help to decrease the density of the joint compound.

A surfactant can also be included in the joint compound formulation. The surfactant generally comprises less than about 3.5% of the joint compound total wet weight, and preferably less than about 0.25%.

Joint compounds provided by the invention are usually made by first combining all dry ingredients in a powder mixer. Water and any additional wet ingredients are then combined with the dry mixture, either at the point of manufacture or at the time of use. Since the micro-crystalline wax is in a dry powder form, it is preferably metered into the other dry ingredients and added to the compound at the powder mixer. Water is then added to the dry ingredients, either during manufacture or immediately prior to use, in an amount to obtain the desired viscosity, usually 300-550 Brabender Units (pin probe). Water is present in the slurry in an amount ranging from about 14% to about 75% by weight of the wet composition, more preferably, in an amount ranging from about 23% to about 55% by weight of the composition. The invention is useful in either a ready-mixed form or as a dry powder to which water is added at the time of use. Either form is suitable for either a drying type or a setting type joint compound.

The joint compound described above is useful in finishing of joints for new construction as well as patching cracks or holes in existing walls. When joints between abutting edges of wallboard are being finished, the area to be finished is coated with the joint compound. A reinforcing tape is embedded in the joint compound while it is still wet. When dry, a second coating of joint compound is applied to the seam. When dry, the seam is sanded lightly. An optional third coat can be applied, with the seam drying and being sanded in between. Patching of small holes or imperfections in the wall are repaired by applying one or more coats of joint compound, allowing the coat to dry and lightly sanding between coats. Whether finishing or patching, the final coat is allowed to dry and sanded to create a smooth, monolithic surface over the entire wall.

Another ingredient that can be included in the joint compound of the invention is a non-leveling agent. Suitable non-leveling agents include clays such as attapulgus clay, bentonite, illite, kaolin and sepiolite, and clays mixed with starches. Thickeners, such as those described above, can also function as non-leveling agents.

To provide a lighter weight joint compound, glass bubbles or a specially treated expanded perlite can be added as described in U.S. Pat. No. 4,454,267. Additional ingredients which can be utilized in the joint compound are preservatives, fungicides, anti-freeze wetting agents, defoamers, flocculants, such as polyacrylamide resin, and plasticizers, such as dipropylene glycol dibenzoate.

In some embodiments, perlite can be used in a joint compound to, for example, control the density, shrinkage, and crack resistance of the joint compound. In some embodiments, perlite need not be used (e.g., where weight is not as much of a factor).

In some embodiments, mica can be used in a compound as well. Mica, which is a low bulk density mineral, may be used as a filler or extender, and may also improve crack resistance of the joint compound.

In some embodiments of the joint compound gypsum (calcium sulfate dihydrate) can also be used. Gypsum can be used to replace calcium carbonate, or can be used in conjunction with calcium carbonate. In some embodiments, talc can be included in a joint compound to, for example, enhance application properties and can also be used as a white extender pigment.

In some embodiments, clay can be used in a joint compound as, for example, a non-leveling agent and/or a thickening agent that can control the viscosity or rheology of the final product. Clay can also help enhance or create the water-holding properties of the joint compound.

In some embodiments, thickeners can be used to control the viscosity, affect the rheology, and affect the water holding characteristics of a joint compound. For example, cellulose ether can be used as a thickener.

In some embodiments, binders can be used in a joint compound to, for example, improve bonding to the substrate such as wallboard.

In some embodiments, a glycol can be used in a joint compound to provide functional properties to the joint compound such as wet edge, open time, controlling drying time, and freeze/thaw stability.

In some embodiments, other rheology modifiers can also be used in conjunction with, or instead of, some of the above described compositions.

In some embodiments, fillers can be used in the joint compound. For example, calcium carbonate, calcium sulfate hemihydrate, or calcium sulfate dehydrate can all be used as fillers, though other materials can be used as well. Further, thickeners, preservatives, binders, and other additives can be incorporated into the joint compound.

Other additives can also be added to the described joint compound in addition to the DRA. In some embodiments, metal siliconate salts such as, for example, potassium siliconate, as well as silicone based compounds such as, for example, poly hydrogen methyl siloxane and polydimethyl siloxane, could provide advantageous water resistance to a joint compound. In some embodiments, fluorinated compounds and stearate-based salts could also be used to provide advantageous water resistance.

Wax emulsions can be particularly advantageous for use in a joint compound as compared to, for example, non-emulsified and/or non-stabilized waxes such as melted PEG M750. These non-emulsified waxes can impart severe deleterious effects on the adhesion properties of a joint compound. Therefore, if the non-emulsified wax is to be used at all, it must be added in very low levels. On the other hand, wax emulsions, such as those described herein, can advantageously increase the adhesion properties of a joint compound, at least due to the adhesive effects of the stabilizer, and thus can be added at higher dosage levels. The wax emulsions can then be useful as they can provide both low dust properties as well as water repellency to the joint compound. The wax emulsion can soften or melt when friction is applied, such as during cutting or sanding. Accordingly, dust can be agglomerated by the softened wax emulsion, where it can be securely held.

Embodiments of the joint compound can be applied in thin layers to a surface. The joint compound can be applied by, for example, using a trowel or other straight edged tool. However, the application and thickness of the layers of joint compounds is not limiting. Further, multiple layers may be applied in order to obtain a smooth, attractive finished wall. The number or layers applied is not limiting. In some embodiments, each layer can be allowed to dry prior to application of the next layer. In some embodiments, a second layer can be applied when the first layer is only partially dried. In some embodiments, the joint compound can be spread over mesh or tape used to connect wallboards. In some embodiments, the joint compound may also be used to patch and texture interior walls. In some embodiments, the joint compound can be made of water, preservative, calcium carbonate, mica, clay, thickener, binder (e.g., latex binder), and a wax emulsion. In addition to a latex binder, other water soluble binders, such as polyvinyl alcohol, can be used as well.

Other materials, such as talc, binders, fillers, thickening agents, preservatives, limestone, perlite, urea, defoaming agents, gypsum latex, glycol, and humectants can be incorporated into the joint compound as well or can substitute for certain ingredients (e.g., talc can be used in place of, or in addition to mica; gypsum can be used in place of, or in addition to calcium carbonate, etc.). In some embodiments, the calcium carbonate can be replaced either wholly or partially with a surface micro-roughened filler that can further enhance the joint compound's hydrophobicity. In some embodiments, Calcimatt™, manufactured by Omya AG, can be used. In some embodiments, cristobalite (silicon dioxide) such as Sibelite® M3000, manufactured by Quarzwerke, can be used. These fillers can be used alone or in combination.

In some embodiments, the joint compound can be mixed in water. This mixture can then be applied to a surface, e.g., hole or joint, and can be allowed to dry. Once the water evaporates from the mixture, a dry, relatively hard cementitious material can remain. In some embodiments, shrinkage may occur upon drying.

FIG. 3 shows an example of a wall system incorporating an embodiment of a low-dust joint compound. As shown, the wall system can be made of a plurality of boards 202. There is no limit to the amount of boards or the positioning of boards next to one another. Where two boards 202 are adjacent to one another, a gap, or joint, can be formed. While the boards 202 themselves may be water-resistant, the joints may allow for moisture to pass through. Therefore, embodiments of the low-dust and water-resistant joint compound 204 can be spread across the joints. The compound 204 can be spread on the joint to completely cover the joint. In some embodiments, the boards 202 can also contain holes. These holes can be formed by nailing the boards 202 into studs, or other attachment means. Regardless of the reason for the hole, the compound 206 can also be used to cover the holes. The compound 206 can insert partial through the holes, or can cover the top of the holes, or both. The compound 206 can cover any fastener, e.g. a screw or nail that is located in the hole. In some embodiments, compound 206 and 204 are the same compound. The application and thickness of the compound 204/206 on the boards 202 is not limiting, and common methods of application can be used.

I. Experimental—DRA Comprising Emulsion Comprising CPWB Microstructures

Low-Dust Joint Compounds—Comparative Examples

To assess the reduction of dust formation during the sanding process by samples created with joint compound compositions of the present invention, the samples are compared with three other commercially available products. Testing is performed on all products upon thorough mixing. The commercially available products compared herein were:
(1) LaFarge North America, Inc.'s ("LaFarge") from United States Gypsum Company's ("USG");
(2) Sheetrock Lightweight All Purpose Plus 3 with Dust Control from USG; and
(3) ProForm DustTech from National Gypsum Company ("NSG").

Test Procedure

A test chamber is constructed as described at Col. 6, Lines 26-56 in U.S. Pat. No. 6,358,309, which is incorporated by reference herein. A power sander made by Makita Corporation, model B04556 is used to sand the specimens. The peak or highest level of dust particles measured for each sample is recorded. (See U.S. Pat. App. Pub. No. 20110065839).

The test procedure for measuring the quantity of airborne particles generated when sanding the hardened joint compound is as follows. First, each test specimen is prepared according to a specific formulation. The test specimens are approximately five inches long; one and one-half inches wide; and one quarter of an inch thick (5"×1½"×¼"). Before sanding, each test specimen is allowed to completely harden for at least 24 hours at room temperature in an environment where the relative humidity generally ranged from about 25% to about 75%.

FIG. 4 shows the Test Enclosure 2 is for sanding the three test specimens and measuring the quantity of generated airborne dust particles. The Enclosure 2 is a rectangular box 6 feet high, 4 feet wide, and 2 feet wide (6'×4'×2'). The top (6), the bottom (8), the side (10), and the rear walls (12) of the Enclosure 2 are constructed of wood, and the front wall (14) is constructed of transparent Plexiglas®. A generally triangular access opening (16) located about one foot above the bottom wall (8) is provided in the front wall (14) to allow the individual conducting the test to insert her hand and arm into the enclosure and sand the specimen. The access opening (16) had a base dimension of about 7½ inches and a height of about 8½ inches. A movable cover member (18) is provided to allow the Enclosure 2 to be completely sealed when sanding is completed. To sand the three specimens, the cover (18) is arranged in its UP position as shown by the solid lines in FIG. 4. When sanding is completed, the cover (18) is pivoted downwardly to completely cover the access opening (16) as shown by phantom lines (18').

As shown, three specimens of joint compound are prepared on a section of wallboard (20) and the section of wallboard (20) is clamped to a mounting block (22) arranged within the Enclosure 2. When tested, the specimens are located about twelve inches above the bottom wall (8) of the enclosure. Each specimen is tested individually and after each test, the enclosure is cleaned so that the quantity of airborne dust particles measured less than 0.5 mg/m3. A particle counter (24) for measuring the quantity of airborne particles is mounted in the right side wall about forty-eight inches above the center of the three specimens.

The power palm sander included a 4½-inch×4.375-inch pad equipped with a 120-grit mesh sanding screen mounted over a 5-inch×3½-inch×¾-inch open, semi-rigid, non-woven, heavy-duty, stripping, backing pad available from Minnesota Mining and Manufacturing Company, St. Paul Minn. Sanding is performed at a sanding speed of approximately 14,000 OPM (orbits per minute) using ordinary sanding pressure. Ordinary sanding pressure is defined as the amount of pressure typically required to sand a hardened joint compound. Sanding pressure, therefore, is the manual pressure typically applied by an ordinary person when sanding a joint compound.

It will be recognized that the sanding pressure can vary depending on the hardness of the joint compound. Sanding is continued until the specimen is completely sanded. That is, the entire thickness of the specimen is sanded so that a generally smooth wall surface is produced. Care is taken to ensure that sanding is discontinued before the drywall itself is sanded. The time required to sand each specimen varied depending on the hardness of the joint compound and the sanding pressure. The quantity of airborne dust particles is measured from the time sanding is initiated until several minutes after sanding is discontinued. In general, the level of airborne dust is measured until the level decreased to less than 50% of its peak level. The quantity of airborne dust is measured using a DUSTTRAK™ aerosol monitor model 8520 available from TSI Incorporated, St. Paul, Minn. The particle counter measures the number of particles having a size of less than or equal to 10 microns. In the Examples, the peak or highest level of airborne dust measured during the test is presented. The test procedure for measuring the quantity of airborne particles generated when sanding the hardened joint compound is largely the same as described in U.S. Pat. No. 6,358,309, which is incorporated herein by reference. In essence, a test specimen is prepared using each of the commercial products and formulations described above.

As described previously, the DRA emulsion formulation is comprised of a micro-crystalline wax, an emulsifier, usually a carboxylic acid or ester that can be saponified via a reaction with a base, and a stabilizer polyvinyl alcohol. Suitable emulsifiers are PAFA esters. Standalone acids from $C_5$ to $C_{100}$, such as stearic acid, can also be used in place of the aforementioned natural waxes. Likewise, standalone esters of similar carbon atom chain length can also be used.

Suitable bases include any compound that is capable of saponifying the ester carboxylate group, or deprotonating the carboxylic acid proton. Suitable bases are inorganic basis such as potassium hydroxide and ammonium hydroxide. Likewise, suitable organic basis are monoethanol amine, diethanol amine, ad triethanol amine.

Two emulsions are prepared for comparison with the commercially available low-dust joint compounds. The first emulsion comprised a paraffin wax based core. The second emulsion comprises a micro-crystalline-wax-based core with the CPWB microstructure.

The joint compound's ability to reduce dust is measured as peak airborne dust production in mg/m$^3$ units, and for the inventive joint compound of the present invention the peak airborne dust (PAD) number is reduced by the following percentage numbers, depending upon the content of the DRA emulsion in the joint compound:

10, 15, 20, 25, 30, 35, 40, 45, 50, 55, 60, 75, 80, 85, 90, 95, and 98%.

In some embodiments of the present invention the PAD number is reduced by a percentage residing in between a range defined by any two numbers above, including the endpoints of such range.

The wax emulsion is made by heating the emulsifier and the micro-crystalline wax in a vessel such that both become molten. In a separate vessel, a measured quantity of polyvinyl alcohol is mixed with water at room temperature after which the mixture is heated to about 180° F. The molten micro-crystalline wax/PAFA ester mixture is then combined with the hot water/polyvinyl alcohol mixture which, upon passing through a charlotte mill, emerged as a stable wax emulsion where the polyvinyl alcohol is tethered to the wax surface, largely encapsulating the wax. A representative formula of the wax emulsion is shown in Table 9.

TABLE 5

Exemplary Embodiment of Dust Reduction Additive Emulsion

| Raw Material | Quantity in Weight by parts |
|---|---|
| Water | 60.1 |
| Polyvinyl alcohol (Kuraray Mowiol 10-98) | 4.1 |
| Glyceryl monostearate | 1.2 |
| ProWax 390 Microcrystalline Wax (Exxon Mobil) | 34.2 |
| Stearic acid | 0.1 |
| Potassium hydroxide | 0.3 |
| Thor CBM-2 (biocide) | 0.10 |
| Total | 100.1 |
| Theoretical solids % | 39.7% |
| Viscosity (Cps, rV Spindle #2, 50 rpm) | 850 |
| pH | 9.5 |

Commercial Low-Dust Joint Compounds

TABLE 6

Airborne Dust Generated by Commercial Low-Dust Joint Compounds

| Commercial Low Dust Joint Compound | Average Peak Airborne Dust (mg/m$^3$) |
|---|---|
| LaFarge Rapid Coat | 130 |
| Sheetrock Dust Control | 67 |
| ProForm DustTech | 74 |

Joint Compound with Inventive CPWB Microstructure-Based DRA Emulsion

TABLE 7

Joint Compound Formulations and Dust Generation

| Experiment No. ⇒ Ingredient ⇓ | Control 0% DRA Emulsion | 1 2% DRA Emulsion | 2 3.1% DRA Emulsion | 3 4.7% DRA Emulsion | 4 6.2% DRA Emulsion |
|---|---|---|---|---|---|
| Preservatives | 0.2 | 0.2 | 0.2 | 0.2 | 0.2 |
| Polyether siloxane copolymer | 0.1 | 0.1 | 0.1 | 0.1 | 0.1 |
| Latex CPS 716 | 7.5 | 5.2 | 5.1 | 4.3 | 3.5 |
| Water | 37.9 | 38.1 | 37.6 | 37.3 | 37.0 |
| Wax emulsion | 0.0 | 2.0 | 3.1 | 4.7 | 6.2 |
| Cellulose ether | 0.6 | 0.6 | 0.6 | 0.6 | 0.6 |
| Attagel 30 clay | 2.0 | 2.0 | 2.0 | 1.9 | 1.9 |
| Mica 4K | 6.3 | 6.3 | 6.3 | 6.2 | 6.2 |
| Microwhite 100 calcium carbonate | 36.3 | 36.5 | 36.1 | 35.8 | 35.5 |
| Perlite, SilCel 43-34 | 9.1 | 9.1 | 9.0 | 8.9 | 8.9 |

TABLE 7-continued

Joint Compound Formulations and Dust Generation

| Experiment No. ⇒<br>Ingredient ⇓ | Control<br>0% DRA<br>Emulsion | 1<br>2% DRA<br>Emulsion | 2<br>3.1% DRA<br>Emulsion | 3<br>4.7% DRA<br>Emulsion | 4<br>6.2% DRA<br>Emulsion |
|---|---|---|---|---|---|
| Peak Airborne Dust (mg/m$^3$) | 104 | 50 | 34 | 23 | 20 |

Five wax emulsions including one Control emulsion are prepared. The Control emulsion has 0% inventive emulsion comprising CpWB microstructures. Experiment 1 has 2%; Experiment 2 has 3.1%; Experiment 3 has 4.7%; and Experiment 4 has 6.2% emulsion included in the joint compound.

The Control sample generates approximately 104 mg/m$^3$ of peak airborne dust. With the addition of CpWB microstructure based DRA composition of the present invention, the peak airborne dust (PAD) production is reduced from 104 mg/m$^3$ to about 20 mg/m$^3$, for the 6% concentration of the CpWB emulsion as percentage of the joint compound weight. Even a 2% CPWB emulsion is reduces the PAD production from 104 mg/m$^3$ to 50 mg/m$^3$, which is a significant improvement in PAD generation. The commercial low dust compound LaFarge has a peak dust production number of 130 mg/m$^3$. Thus, at a 6% inclusion of CPWB, the peak airborne dust production is reduced by 85%. Similarly, the commercial low dust compounds Sheetrock Dust has a peak dust production 67 mg/m$^3$ and ProForm DustTech has a PAD production of 74 mg/m$^3$. Thus, at 6% inclusion of CPWB emulsion the PAD production is reduced by about 47% and 73%.

The comparative improvement in the PAD numbers at variety of CPWB microstructure based emulsions is provided in Table 12 below.

TABLE 8

PAD value Improvement in of the Inventive Composition over Commercial Products

| Comparative<br>Commercial<br>Low Dust<br>Compound | DRA<br>Emulsion<br>0% | DRA<br>Emulsion<br>2% | DRA<br>Emulsion<br>3.1% | DRA<br>Emulsion<br>4.7% | DRA<br>Emulsion<br>6.2% |
|---|---|---|---|---|---|
| LaFarge Rapid Coat (130 mg/m$^3$) | 20% | 61% | 74% | 82% | 85% |
| Sheetrock Dust Control (67 mg/m$^3$) | −36% | 25% | 49% | 66% | 70% |
| ProForm DustTech (74 mg/m$^3$) | −40% | 32% | 54% | 69% | 73% |

Thus, the CPWB microstructure-based DRA emulsion based joint compound shows a significant and surprising peak airborne dust reduction compared to the control as well as the commercially available compounds.

In some embodiments, the disclosed joint compound can cover a joint or hole and provide dust reduction. Further, the joint compound is formulated to properly adhere to any boards that the compound is placed onto. With regards to adhesion, embodiments of the joint compound can have at least about 90%, 95%, 99%, or 100% bond according to an ASTM C474 peel test, hereby incorporated by reference in its entirety. Further, the joint compound can have adequate sag resistance, compatibility, and contact angle.

Low-Dust Products

Embodiments of the disclosed micro-crystalline wax or micro-crystalline wax emulsion can be used to form many different low-dust compounds. For example, embodiments of the micro-crystalline wax or micro-crystalline wax emulsion can be incorporated into building materials such as asphalt (e.g., comprising a viscous liquid or semi-solid form of petroleum), concrete (e.g., comprising aggregate or filler, cement, water, various chemical and/or mineral admixtures, etc.), stucco, cement (e.g., formed from or comprising calcium carbonate, clay, gypsum, fly ash, ground granulated blast furnace slag, lime and/or other alkalis, air entrainers, retarders, and/or coloring agents) or other binders. In some embodiments, the micro-crystalline wax or micro-crystalline wax emulsion can be incorporated into concrete cover coat formulations, such as those used for filling, smoothing, and/or finishing interior concrete surfaces, drywall tape, bead embedment, skim-coating, and texturing drywall.

Further, embodiments of the micro-crystalline wax or micro-crystalline wax emulsion can be incorporated into concrete and/or cement mixtures as a dust reduction additive. Therefore, embodiments of the micro-crystalline wax or micro-crystalline wax emulsion can be incorporated into pourable concrete and/or cement that can be used, for example, for foundations in home constructions. Additionally, embodiments of the micro-crystalline wax or micro-crystalline wax emulsion can be used in cinder blocks as well as other similar concrete or cement based products. In some embodiments, a low-dust building material can be formed with cement, micro-crystalline wax or micro-crystalline wax emulsion, and silicone, or siloxane, or siliconate, or fluorinated compound, or stearate, or combinations thereof.

Embodiments of the micro-crystalline wax or micro-crystalline wax emulsion can also be incorporated into boards, such as cement boards (e.g., a relatively thin board, comprising cement bonded particle boards and cement fiber (e.g., comprising cement, fillers, cellulose, mica, etc.), which may be 0.25-0.5 inch thick or which may be thicker or thinner), and/or cement board formulations. Therefore, the micro-crystalline wax or micro-crystalline wax emulsion can be used to provide additional dust reduction/of the boards.

From the foregoing description, it will be appreciated that inventive devices and approaches for low-dust/and micro-crystalline wax or micro-crystalline wax emulsion have been disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination as well as in a single implementation. Conversely, various features that are described in the context of a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using for the same will be apparent to those of skill in the art. Accordingly, it should be understood that various applications, modifications, materials, and substitutions can be made of equivalents without departing from the unique and inventive disclosure herein or the scope of the claims.

What is claimed:

1. A non-foaming dust reduction additive emulsion comprising colloidally-protected wax-based (CPWB) microstructures, wherein said CPWB microstructures comprise:
   (A) a wax core,
      wherein said wax core comprises a wax component and a tethering component,
         wherein said wax component comprises at least one linear alkane wax defined by the general formula $C_nH_{2n+2}$, where n ranges from 13-80,
         wherein said tethering component comprises at least one a PAFA ester carboxylate, wherein said polyhydric alcohol fatty acid (PAFA) ester carboxylate fatty acid chain is from about 4 to about 100 carbon atoms, and
   (B) a polymeric shell,
      wherein said polymeric shell comprises at least one polymer selected from polyvinyl alcohol, polyvinyl alcohol copolymers, polyvinyl alcohol terpolymers, polyvinyl acetate, polyvinyl acetate copolymers, polyvinyl acetate terpolymers, cellulose ethers, polyethylene oxide, polyethyleneimines, polyvinylpyrrolidone, polyvinylpyrrolidone copolymers, polyethylene glycol, polyacrylamides and poly (N-isopropylamides), pullulan, sodium alginate, gelatin, starches, and combinations thereof.

2. The non-foaming dust reduction additive emulsion as recited in claim 1, wherein said polymeric shell comprises polyvinyl alcohol.

3. The non-foaming dust reduction additive emulsion as recited in claim 1, wherein said PAFA ester carboxylate has the polyhydric alcohol selected from glycol, glycerol, and polyethylene glycol.

4. The non-foaming dust reduction additive emulsion as recited in claim 3, wherein said PAFA ester carboxylate has the fatty acid as stearic acid.

5. The non-foaming dust reduction additive emulsion as recited in claim 1, wherein said dust-reduction additive emulsion further comprises water; a base; and a dispersant.

6. A joint compound composition, comprising the non-foaming dust reduction additive emulsion as recited in claim 1, wherein the weight of said dust reduction additive emulsion is in the range of from about 0.1% to about 20% by weight of said joint compound composition.

7. A joint compound composition, comprising the non-foaming dust reduction additive emulsion as recited in claim 1, wherein the quantity of dust generated upon sanding of said low-dust joint compound composition is reduced at least by 5%.

8. A joint compound composition, comprising the non-foaming dust reduction additive emulsion as recited in claim 1, wherein the quantity of dust generated upon sanding of said low-dust joint compound composition is reduced at least by 80%.

9. A method of using said low-dust joint compound composition as recited in claim 1, said method comprising:

(I) applying said composition to a joint between adjacent wallboard panels;
(II) allowing said composition to dry; and
(III) sanding said dried composition.

10. A method of using joint compound composition that has low-dust property and improved adhesive property, said method comprising:
(I) applying said composition to a joint between adjacent wallboard panels;
(II) allowing said composition to dry; and
(III) sanding said dried composition,
wherein said joint compound composition comprises:
(a) the non-foaming dust reduction additive emulsion of claim 1, comprising colloidally-protected wax-based (CPWB) microstructures, wherein said CPWB microstructures comprise at least one PAFA ester carboxylate, and
(b) a first water.

11. The method as recited in claim 10, wherein said dust reduction additive emulsion comprises said CPWB microstructure comprising:
(A) a wax core,
wherein said wax core comprises a wax component and a tethering component,
wherein said wax component comprises at least one linear alkane wax defined by the general formula $C_nH_{2n+2}$, where n ranges from 13-80,
wherein said tethering component comprises at least one PAFA ester carboxylate, wherein said PAFA ester carboxylate fatty acid chain is from about 4 to about 100 carbon atoms, and
(B) a polymeric shell,
wherein said polymeric shell comprises at least one polymer selected from polyvinyl alcohol, polyvinyl alcohol copolymers, polyvinyl alcohol terpolymers, polyvinyl acetate, polyvinyl acetate copolymers, polyvinyl acetate terpolymers, cellulose ethers, polyethylene oxide, polyethyleneimines, polyvinylpyrrolidone, polyvinylpyrrolidone copolymers, polyethylene glycol, polyacrylamides and poly (N-isopropylamides), pullulan, sodium alginate, gelatin, starches, and combinations thereof.

12. The method as recited in claim 11, wherein said polymeric shell comprises polyvinyl alcohol.

13. The method as recited in claim 11, wherein said PAFA ester carboxylate has the polyhydric alcohol selected from glycol, glycerol, and polyethylene glycol.

14. The method as recited in claim 13, wherein said PAFA ester carboxylate has the fatty acid as stearic acid.

15. The method as recited in claim 11, wherein said dust-reduction additive emulsion further comprises a second water; a base; and a dispersant.

16. The method as recited in claim 11, wherein the weight of said dust reduction additive emulsion is in the range of from about 0.1% to about 20% by weight of said joint compound composition.

17. The method as recited in claim 11, wherein the quantity of dust generated upon sanding of said low-dust joint compound composition is reduced at least by 5%.

18. The method as recited in claim 11, wherein the quantity of dust generated upon sanding of said low-dust joint compound composition is reduced at least by 80%.

19. The method for reducing the quantity of dust generated by a joint-compound as recited in claim 18, wherein the quantity of dust generated by sanding said hardened drywall joint-compound is reduced by at least 80%.

* * * * *